(12) United States Patent
Sloan et al.

(10) Patent No.: US 10,899,214 B2
(45) Date of Patent: Jan. 26, 2021

(54) ELECTRIC POWERTRAIN SYSTEM FOR HEAVY DUTY VEHICLES

(71) Applicant: Hexagon Purus North America Holdings Inc., Lincoln, NE (US)

(72) Inventors: Todd F. Sloan, Kelowna (CA); Chris Forsberg, Kelowna (CA); Eric M. Coupal-Sikes, Kelowna (CA); Landon Tyerman, Kelowna (CA)

(73) Assignee: Hexagon Purus North America Holdings Inc., Lincoln, NE (US)

( * ) Notice: Subject to any disclaimer, the term of this patent is extended or adjusted under 35 U.S.C. 154(b) by 0 days.

(21) Appl. No.: 16/852,150

(22) Filed: Apr. 17, 2020

(65) Prior Publication Data

US 2020/0331334 A1   Oct. 22, 2020

Related U.S. Application Data

(60) Provisional application No. 62/836,367, filed on Apr. 19, 2019.

(51) Int. Cl.
| | |
|---|---|
| *B60K 1/04* | (2019.01) |
| *B60L 50/60* | (2019.01) |
| *B60K 6/28* | (2007.10) |

(52) U.S. Cl.
CPC ............... *B60K 1/04* (2013.01); *B60L 50/66* (2019.02); *B60K 6/28* (2013.01); *B60Y 2200/91* (2013.01); *B60Y 2200/92* (2013.01)

(58) Field of Classification Search
CPC .... B60K 1/04; B60K 2001/0444; B60L 50/66
See application file for complete search history.

(56) References Cited

U.S. PATENT DOCUMENTS

| 1,678,033 A | 7/1928 | Brumbaugh |
| 4,248,323 A | 2/1981 | Gaffney |

(Continued)

FOREIGN PATENT DOCUMENTS

| AU | 2018232986 | 4/2019 |
| CN | 2647706 | 10/2004 |

(Continued)

OTHER PUBLICATIONS

Kenworth, "K270E, Zero Emissions", 2020, in 2 pages.

(Continued)

*Primary Examiner* — Brian L Swenson
(74) *Attorney, Agent, or Firm* — Knobbe Martens Olson & Bear, LLP

(57) ABSTRACT

A battery assembly for an electric vehicle is provided that includes a housing, one or more battery units, and a mounting system. The one or more battery units are disposed within the housing. The mounting system is disposed adjacent to a top surface, e.g., on a planar top surface or within an upwardly oriented concavity. The mounting system has a frame member bracket and a housing bracket system. The housing bracket system includes a housing bracket, a load member and a vibration isolator. The housing bracket is configured to be coupled to the frame member bracket. The load member has a first portion disposed adjacent to an upper surface and a second portion disposed along a lateral portion of the housing. The vibration isolator is disposed between the load member and the housing bracket. The vibration isolator is configured to reduce load transmission from the frame member of the vehicle to the housing.

30 Claims, 28 Drawing Sheets

(56) References Cited

U.S. PATENT DOCUMENTS

| | | | |
|---|---|---|---|
| 4,317,497 A | 3/1982 | Alt et al. | |
| 4,365,681 A | 12/1982 | Singh | |
| 5,460,234 A | 10/1995 | Matsuura et al. | |
| 5,558,949 A | 9/1996 | Iwatsuki et al. | |
| 5,585,205 A | 12/1996 | Kohchi | |
| 6,188,574 B1 | 2/2001 | Anazawa | |
| 6,547,020 B2 | 4/2003 | Maus et al. | |
| 6,575,258 B1 | 6/2003 | Clemmer | |
| 6,624,610 B1 | 9/2003 | Ono et al. | |
| 6,668,957 B2 | 12/2003 | King | |
| 6,971,657 B2 * | 12/2005 | King | B60R 3/00 182/127 |
| 7,051,825 B2 | 5/2006 | Masui et al. | |
| 7,144,039 B2 | 12/2006 | Kawasaki et al. | |
| 7,237,644 B2 | 7/2007 | Matsumoto et al. | |
| 7,507,499 B2 | 3/2009 | Zhou et al. | |
| 7,931,105 B2 | 4/2011 | Sato et al. | |
| 8,037,960 B2 | 10/2011 | Kiya | |
| 8,051,934 B2 | 11/2011 | Kiya et al. | |
| 8,127,876 B2 | 3/2012 | Phillips | |
| 8,276,697 B2 | 10/2012 | Takasaki | |
| 8,342,279 B1 | 1/2013 | Florus et al. | |
| 8,397,853 B2 | 3/2013 | Stefani et al. | |
| 8,464,817 B2 | 6/2013 | Usami et al. | |
| 8,474,559 B2 | 7/2013 | Sogabe | |
| 8,517,126 B2 | 8/2013 | Atarashi | |
| 8,596,685 B2 | 12/2013 | Mauduit et al. | |
| 8,616,319 B2 | 12/2013 | Yokoyama et al. | |
| 8,776,927 B2 | 7/2014 | Akazawa et al. | |
| 8,778,527 B2 | 7/2014 | Lee | |
| 8,783,396 B2 | 7/2014 | Bowman | |
| 8,789,635 B2 | 7/2014 | Franzen et al. | |
| 8,794,361 B2 | 8/2014 | Lim et al. | |
| 8,905,170 B2 | 12/2014 | Kyoden et al. | |
| 9,033,078 B2 | 5/2015 | Fillion et al. | |
| 9,033,085 B1 | 5/2015 | Rawlinson | |
| 9,056,557 B2 | 6/2015 | Kedzierski | |
| 9,061,712 B2 | 6/2015 | Patberg et al. | |
| 9,077,019 B2 | 7/2015 | Kosaki et al. | |
| 9,085,226 B2 | 7/2015 | Matsuda et al. | |
| 9,103,092 B2 * | 8/2015 | Ueda | H01M 10/613 |
| 9,108,497 B2 | 8/2015 | Harrison, III et al. | |
| 9,205,749 B2 | 12/2015 | Sakamoto | |
| 9,227,582 B2 | 1/2016 | Katayama et al. | |
| 9,283,838 B2 | 3/2016 | Ohashi | |
| 9,409,495 B2 | 8/2016 | Kobayashi | |
| 9,457,652 B2 | 10/2016 | Sloan et al. | |
| 9,586,490 B2 | 3/2017 | Yamamaru et al. | |
| 9,636,984 B1 | 5/2017 | Baccouche et al. | |
| 9,776,665 B2 | 10/2017 | Garay et al. | |
| 9,812,685 B2 | 11/2017 | Nozaki et al. | |
| 9,902,348 B2 | 2/2018 | Takeda | |
| 10,000,908 B2 | 6/2018 | Ota et al. | |
| 10,017,037 B2 | 7/2018 | Newman et al. | |
| 10,160,344 B2 | 12/2018 | Newman | |
| 10,166,883 B2 | 1/2019 | Brendecke et al. | |
| 10,177,356 B1 | 1/2019 | Yang et al. | |
| 10,183,698 B2 | 1/2019 | Ta et al. | |
| 10,236,496 B2 | 3/2019 | Nakayama et al. | |
| 10,259,329 B2 | 4/2019 | Hosaka et al. | |
| 10,308,132 B2 | 6/2019 | Milton et al. | |
| 10,358,023 B2 | 7/2019 | Hegewald et al. | |
| 10,358,024 B2 | 7/2019 | Yugami et al. | |
| 10,414,351 B2 | 9/2019 | Katano | |
| 10,427,627 B2 | 10/2019 | Fukazu et al. | |
| 10,457,156 B2 | 10/2019 | Takizawa et al. | |
| 10,464,613 B2 | 11/2019 | Okura | |
| 10,486,515 B2 | 11/2019 | Saeki | |
| 10,493,837 B1 | 12/2019 | Angelo et al. | |
| 10,516,146 B2 | 12/2019 | Fees et al. | |
| 10,543,796 B2 | 1/2020 | Isafushi et al. | |
| 10,559,858 B2 | 2/2020 | Goitsuka et al. | |
| 10,569,634 B2 | 2/2020 | Dawley | |
| 10,583,746 B2 | 3/2020 | Ogaki et al. | |
| 10,589,788 B1 | 3/2020 | Milton et al. | |
| 10,604,188 B2 | 3/2020 | Yoshii | |
| 10,611,408 B2 | 4/2020 | Fritz et al. | |
| 10,688,856 B2 | 6/2020 | Kasai et al. | |
| 10,688,857 B2 | 6/2020 | Tsuyuzaki et al. | |
| 10,696,251 B2 | 6/2020 | Muramatsu et al. | |
| 10,703,416 B2 | 7/2020 | Okura et al. | |
| 2004/0134699 A1 | 7/2004 | Shimizu | |
| 2004/0178602 A1 * | 9/2004 | King | B60R 3/00 280/163 |
| 2004/0231831 A1 | 11/2004 | Houck et al. | |
| 2005/0162015 A1 | 7/2005 | Yamaguchi et al. | |
| 2005/0218136 A1 | 10/2005 | Kotani et al. | |
| 2008/0169139 A1 | 7/2008 | Kramer | |
| 2008/0225483 A1 | 9/2008 | Kahn et al. | |
| 2008/0258682 A1 | 10/2008 | Li | |
| 2010/0000816 A1 | 1/2010 | Okada | |
| 2010/0112843 A1 | 5/2010 | Heichal et al. | |
| 2010/0163326 A1 | 7/2010 | Takamura et al. | |
| 2010/0175940 A1 | 7/2010 | Taneda et al. | |
| 2010/0320012 A1 * | 12/2010 | Stappen | B60L 50/66 180/65.1 |
| 2011/0068622 A1 | 3/2011 | Ikeno et al. | |
| 2011/0114398 A1 * | 5/2011 | Bianco | B60L 50/66 180/65.1 |
| 2012/0055725 A1 | 3/2012 | Mizoguchi et al. | |
| 2012/0090907 A1 | 4/2012 | Store et al. | |
| 2012/0103714 A1 | 5/2012 | Choi et al. | |
| 2012/0160583 A1 | 6/2012 | Rawlinson | |
| 2012/0175177 A1 | 7/2012 | Lee et al. | |
| 2012/0255799 A1 | 10/2012 | Kohler et al. | |
| 2013/0248268 A1 | 9/2013 | Matsuda et al. | |
| 2014/0141288 A1 | 5/2014 | Kim et al. | |
| 2014/0338999 A1 | 11/2014 | Fujii et al. | |
| 2015/0291056 A1 * | 10/2015 | Nozaki | B60L 53/80 180/65.1 |
| 2016/0079795 A1 | 3/2016 | Patterson et al. | |
| 2016/0087256 A1 | 3/2016 | Wagner et al. | |
| 2016/0190526 A1 * | 6/2016 | Yamada | H01M 10/0481 180/68.5 |
| 2016/0226041 A1 | 8/2016 | Jackson et al. | |
| 2017/0282709 A1 | 10/2017 | Sasaki et al. | |
| 2017/0320382 A1 | 11/2017 | Milton et al. | |
| 2018/0022389 A1 * | 1/2018 | Kageyama | B62D 21/157 296/187.08 |
| 2018/0062125 A1 | 3/2018 | Kaneshige | |
| 2018/0145382 A1 | 5/2018 | Harris et al. | |
| 2018/0183118 A1 | 6/2018 | Harris et al. | |
| 2018/0190960 A1 | 7/2018 | Harris et al. | |
| 2018/0319263 A1 * | 11/2018 | Hegewald | B60L 1/00 |
| 2018/0339594 A1 | 11/2018 | Brown et al. | |
| 2018/0370368 A1 | 12/2018 | Kronsteiner et al. | |
| 2019/0036181 A1 | 1/2019 | Tokozakura et al. | |
| 2019/0061505 A1 | 2/2019 | Cavus et al. | |
| 2019/0074495 A1 | 3/2019 | Haeusler et al. | |
| 2019/0074497 A1 | 3/2019 | Haeusler et al. | |
| 2019/0081298 A1 | 3/2019 | Matecki et al. | |
| 2019/0181517 A1 | 3/2019 | Kellner et al. | |
| 2019/0229314 A1 | 7/2019 | Ribbentrop et al. | |
| 2019/0263449 A1 | 8/2019 | Ta et al. | |
| 2019/0291560 A1 * | 9/2019 | Lampsa | B60L 53/14 |
| 2019/0326573 A1 * | 10/2019 | Ozawa | B60K 1/04 |
| 2019/0393571 A1 | 12/2019 | Weicker et al. | |
| 2020/0083573 A1 | 3/2020 | Caliskan et al. | |
| 2020/0247225 A1 | 8/2020 | Kochi et al. | |
| 2020/0259143 A1 | 8/2020 | Sloan et al. | |

FOREIGN PATENT DOCUMENTS

| | | |
|---|---|---|
| CN | 103863080 | 6/2014 |
| CN | 105438262 | 3/2016 |
| DE | 101 08 713 A1 | 9/2002 |
| DE | 10 2006 009 189 | 7/2007 |
| DE | 10 2011 109 024 | 1/2013 |
| DE | 10 2012 10906 | 3/2014 |
| EP | 1 577 143 A1 | 9/2005 |
| EP | 2 712 748 B1 | 5/2017 |
| EP | 3 640 123 A1 | 4/2020 |
| GB | 491788 | 9/1938 |

(56) References Cited

FOREIGN PATENT DOCUMENTS

| GB | 527052 | 10/1940 |
|---|---|---|
| JP | 2010-100207 | 5/2010 |
| KR | 10-1998-0035495 | 8/1998 |
| KR | 10-2017-0000950 | 1/2017 |
| WO | WO 2018/123337 | 7/2018 |
| WO | WO 2020/041630 | 2/2020 |

OTHER PUBLICATIONS

International Search Report and Written Opinion issued in PCT Application No. PCT/US2019/047773, dated Nov. 18, 2019, in 16 pages.
International Search Report and Written Opinion issued in International Patent Application No. PCT/US2020/028859, dated Sep. 4, 2020 in 15 pages.
International Search Report and Written Opinion issued in International Patent Application No. PCT/US2020/028866, dated Aug. 14, 2020 in 18 pages.
Invitation to Pay Additional Search Fees in International Patent Application No. PCT/US2020/028859, dated Jul. 1, 2020 in 2 pages.
Invitation to Pay Additional Search Fees in International Patent Application No. PCT/US2020/028866, dated Jun. 4, 2020 in 2 pages.
Response to Office Action submitted Oct. 23, 2020 in U.S. Appl. No. 16/852,187.
Response to Office Action submitted Nov. 5, 2020 in U.S. Appl. No. 16/863,131.
Notice of Allowance issued in U.S. Appl. No. 16/852,187, dated Nov. 30, 2020.
Notice of Allowance issued in U.S. Appl. No. 16/863,131, dated Dec. 18, 2020.

* cited by examiner

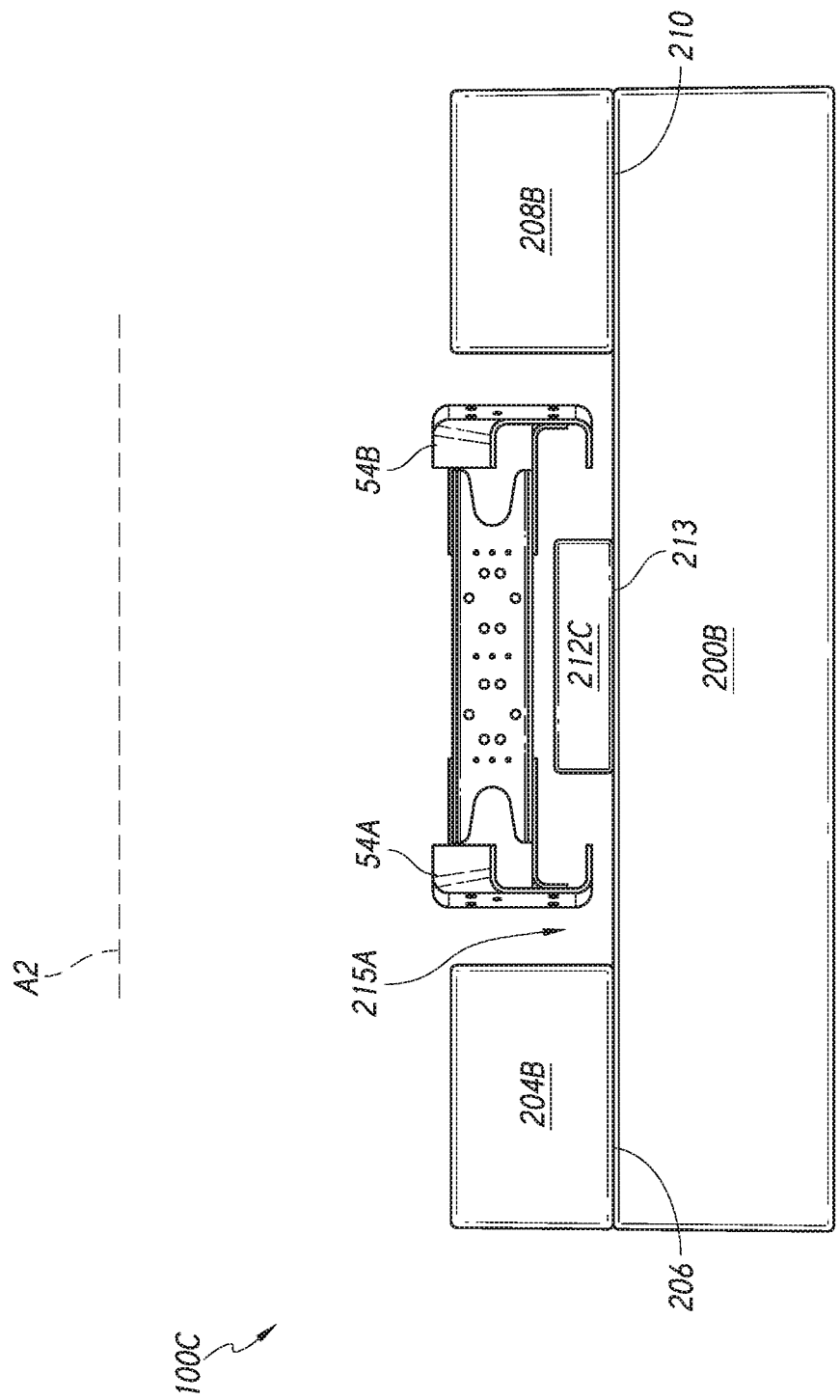

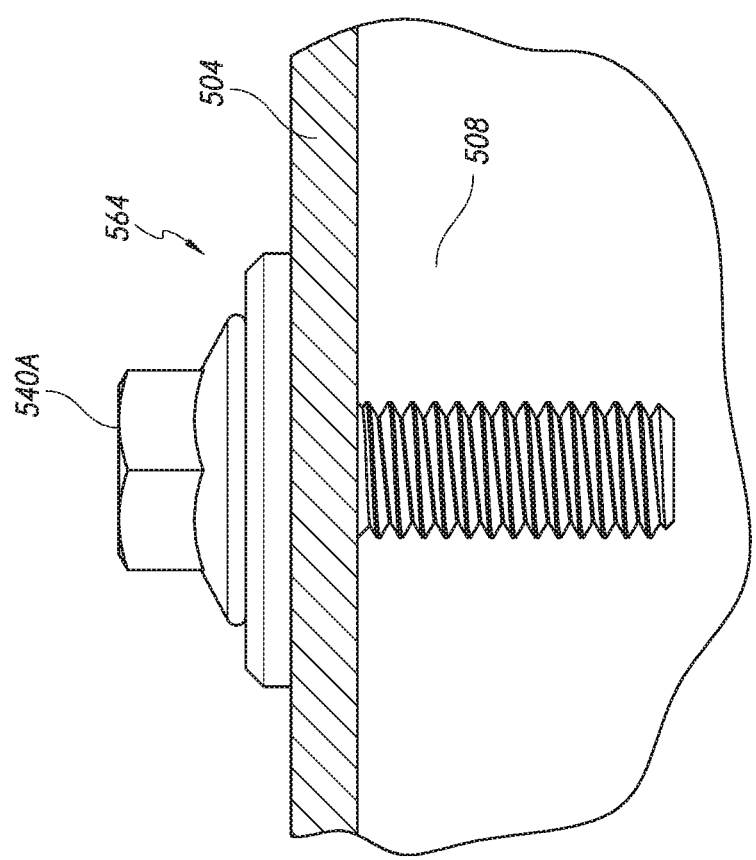

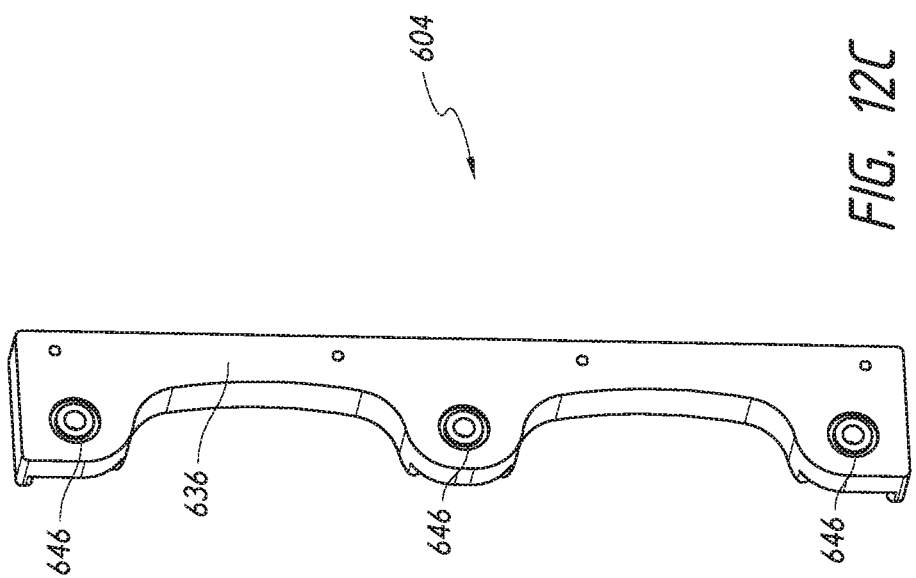

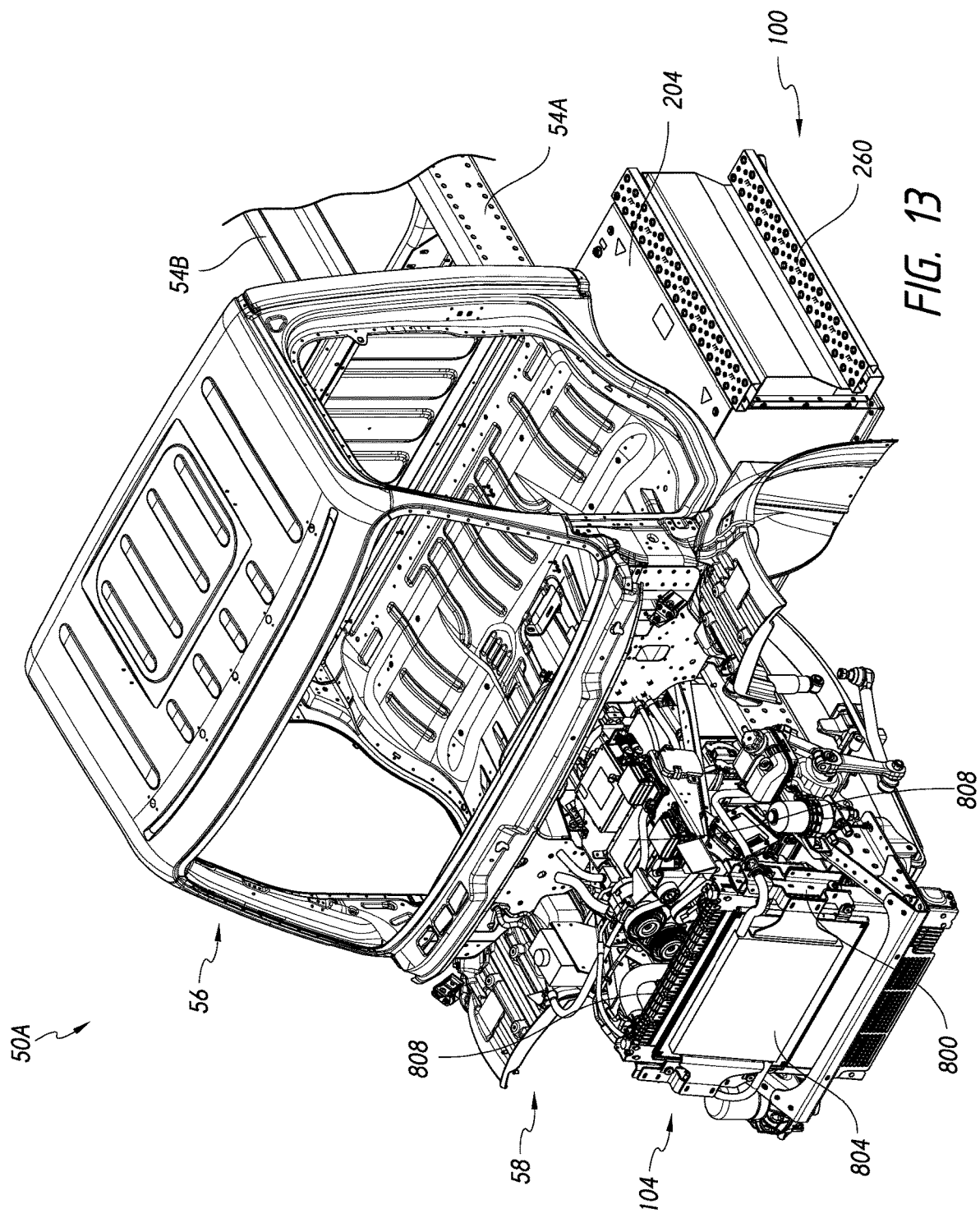

ELECTRIC POWERTRAIN SYSTEM FOR HEAVY DUTY VEHICLES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

Field

This application is directed to electric power systems for vehicles that can include a battery assembly and an accessory component assembly configured to be in electrical and/or fluid communication with the battery assembly.

Related Art

The use of alternative fuels for vehicles is becoming more prevalent. A growing trend is the use of electrical motors for propulsion, particularly in small passenger vehicles. However, such systems have not been widely commercialized in larger and/or heavy duty vehicles.

SUMMARY

In some examples disclosed herein modular systems are provided that enable one or more battery assemblies to be paired with one or more accessory device assemblies. Modularity can provide expansion of storage capacity and rapid assembly to existing chassis configurations. In some examples, mechanical integration of a battery assembly into a vehicle is improved. Such integration can provide improved vibration and shock isolation in mounting systems disposed. Such integration can maintain ingress protection of assemblies that benefit from reduced exposure to or exclusion of moisture.

In one example, a modular electric vehicle system is provided that includes a plurality of battery assemblies for an electric vehicle and a front end accessory component assembly. The plurality of battery assemblies each include a housing, one or more battery units and a mounting system. The housing has a first lateral portion, a second lateral portion, and a central portion. The housing includes an upwardly oriented recess between the first and second lateral portions. The one or more battery units is or are disposed within the housing at least in the central portion. The mounting system is disposed at least partially between the first lateral portion and the second lateral portion. The front end accessory component assembly is configured to mount to a vehicle chassis. The front end accessory component assembly has a frame and plurality of vehicle accessory components coupled to the frame. The frame is configured to mount to the chassis to simultaneously couple the plurality of vehicle accessory components to the chassis. The modular electric vehicle system is configured such that the front end accessory component can be placed in electrical communication and/or in fluid communication with one or more subsystems of the modular electric vehicle system.

In one example, the modular electric vehicle system is configured such that the front end accessory component can be placed in electrical communication and/or in fluid communication with one or more than one of the plurality of battery assemblies.

In another example, a battery assembly for an electric vehicle is provided that includes a housing, one or more battery units, and a mounting system. The housing has a lateral portion and a central portion. The housing includes an upwardly oriented concavity between the lateral portion and the central portion. The one or more battery units are disposed within the housing at least in the central portion. The mounting system is disposed adjacent to or within the concavity. The mounting system further has a frame member bracket and a housing bracket system. The frame member bracket is configured to connect to a frame member of a vehicle. The housing bracket system includes a housing bracket, a load member and a vibration isolator. The housing bracket is configured to be coupled to the frame member bracket. The load member has a first portion disposed adjacent to an upper surface of the housing and a second portion disposed along the lateral portion. The vibration isolator is disposed between the load member and the housing bracket. The vibration isolator is configured to reduce load transmission from the frame member of the vehicle to the housing.

In one variation, the vibration isolator is a first vibration isolator and the battery assembly includes a second vibration isolator. The first vibration isolator is configured to reduce vertical load transmission from the frame member of the vehicle to the housing. The second vibration isolator is disposed between the load member and the housing bracket. The second vibration isolator is configured to reduce horizontal load transmission from the frame member of the vehicle to the housing.

In another example, a battery assembly for an electric vehicle is provided that includes a housing, one or more battery units and a fastener assembly. The housing has a concave shell with an internal space and an opening for providing access to the internal space. The one or more battery units are disposed within the internal space of the housing. The fastener assembly is configured to secure another component of the battery assembly to the concave shell while maintaining ingress protection. The fastener assembly includes a bolt, a load spreading member and at least one seal member disposed in a recess of the load spreading member. The recess is disposed on a side of the load spreading member facing or contacting the housing.

In another example, a battery assembly for an electric vehicle is provided. The battery assembly includes a housing, one or more battery units, and a step assembly. The housing has a first lateral portion, a second lateral portion, and a central portion. The one or more battery units is or are disposed within the housing. The step assembly has a vehicle side comprising a mounting bracket and a step enclosure coupled with the mounting bracket. A step can be on an outboard side of the step assembly.

In one variation, the step assembly includes a crumple member. The crumple member can be disposed on or in the step enclosure. The crumple member can be pre-crushed or weakened in a preferred direction. The crumple member can be configured to preferentially collapse in one direction. The crumple member can be configured to absorb impact energy to reduce loads applied to other components of the battery assemblies disclosed herein.

In one variation, the step is a lower step and the battery assembly also includes an upper step. The upper step can be disposed on the outboard side or a top side of the step assembly at an elevation above an elevation of the lower step.

In another embodiment a battery assembly is provided that includes a housing having a first lateral side, a second lateral side, and a planar portion extending along a top surface of the housing from the first lateral side to the second lateral side. One or more battery units are disposed within the housing. A mounting system is coupled with the top surface and is configured to secure the housing below a vehicle assembly.

A modular electric vehicle system can be provided. The modular system can include any of the battery assemblies described in the preceding paragraph and an auxiliary component configured to be removeably coupled with the top surface of the housing of the battery assembly. The auxiliary component can comprise a lateral component configured to be disposed laterally of the mounting system. The auxiliary component can comprise a lateral component configured to be disposed laterally of the mounting system. The auxiliary component can be configured to be mounted to the top surface of the housing between the mounting system and a central vertical plane of the housing.

BRIEF DESCRIPTION OF THE DRAWINGS

Features of the invention can be better understood from the following detailed description when read in conjunction with the accompanying schematic drawings, which are for illustrative purposes only. The drawings include the following figures:

FIG. 3C is a schematic front or rear view of a modular battery assembly having multiple components that can be assembled into a W-shaped housing configuration and that can be mounted to longitudinal frame members of a frame assembly of a vehicle assembly;

FIG. 11A-11D illustrate embodiments of fastener assemblies applied to a portion of the housing of the battery assembly of FIG. 3;

FIG. 12C illustrates a housing side of the multi-point load spreading member of FIG. 12B; and FIG. 13 is a perspective view of a portion of a vehicle assembly with the battery assembly positioned below the cab.

DETAILED DESCRIPTION

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application discloses inventive electrical power systems. The systems disclosed and claimed herein can include a battery assembly 100. The systems can include one or more battery assemblies 100. In some examples, the one or more battery assemblies 100 can be configured to be coupled with or can be coupled with a front end accessory component assembly 104. These systems can be modular such that for specific applications more or fewer battery assemblies 100 can be provided and/or the front end accessory component assembly 104 can be included or one of several configurations of the front end accessory component assembly 104 can paired with one or more battery assembly 100. These systems can be highly integrated. By providing such systems, a vehicle assembly 50 can be quickly equipped to provide a battery assembly that can power an electric motor and electrical accessories of the vehicle. The systems can enable a front end accessory component assembly to be in electrical and/or fluid communication with multiple subsystems that operate in a vehicle.

I. Vehicle Assembly Including Electrical Power System

Figure 1:
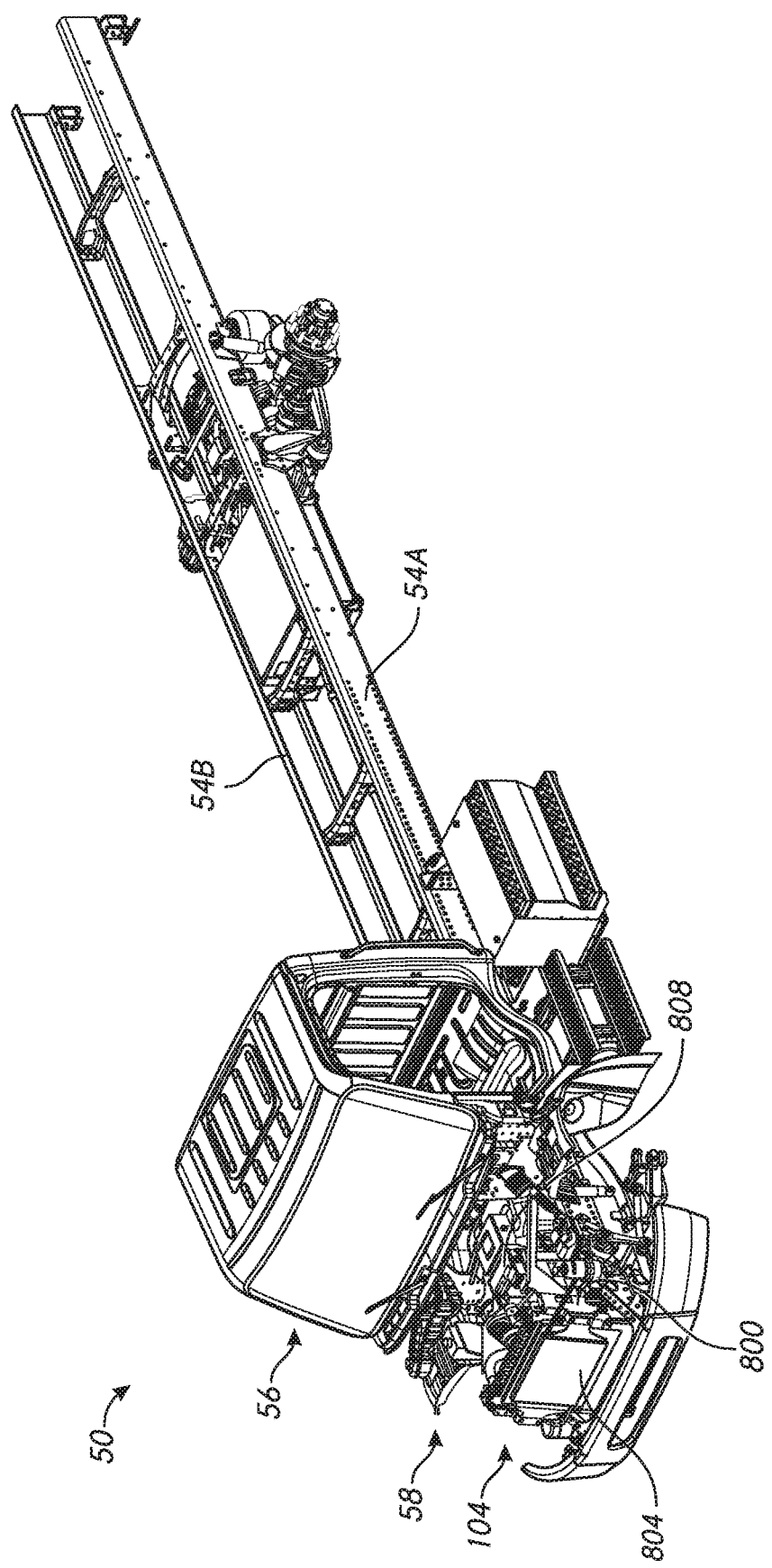
FIG. 1 is a top perspective view of a vehicle assembly.
Figure 2:
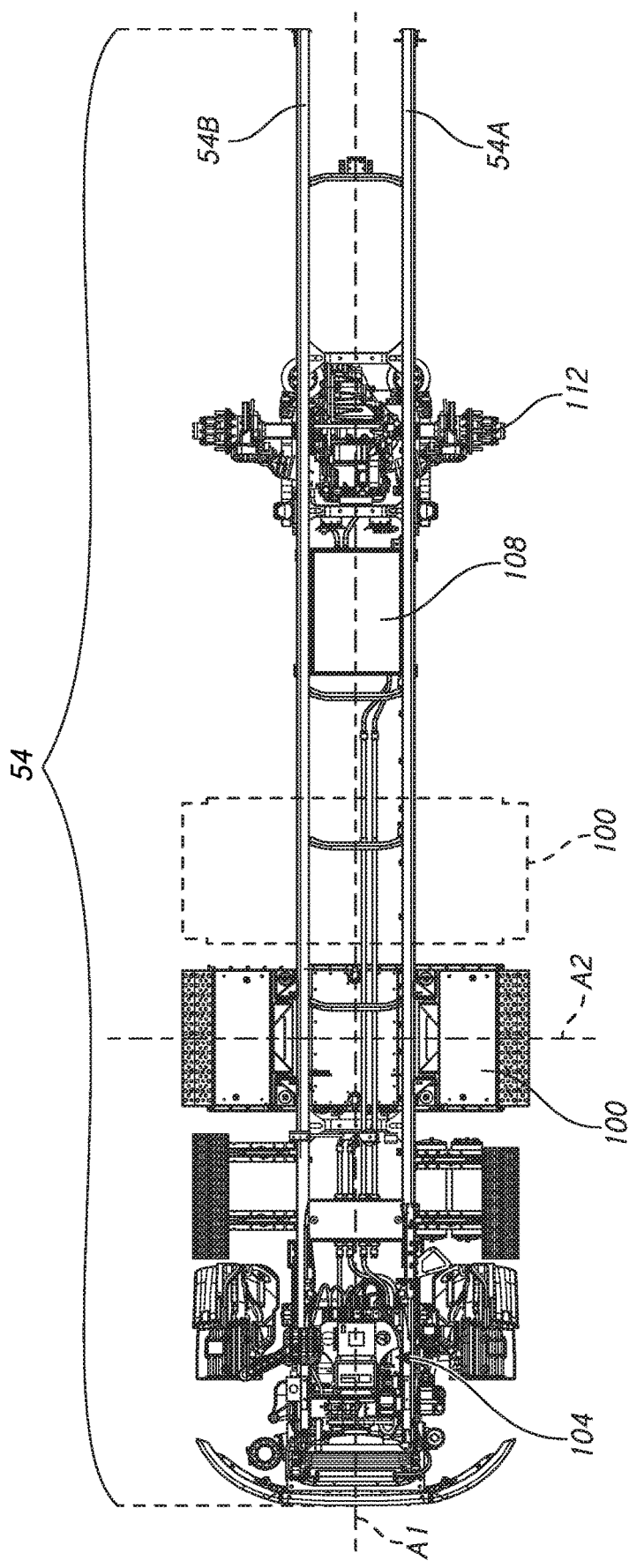
FIG. 2 is a top view of the vehicle assembly shown in FIG. 1 with a cab assembly removed for clarity.

FIGS. 1 and 2 show an example of a vehicle assembly 50 that can be equipped with one or more examples of systems disclosed herein. A fully assembled vehicle would have more components than illustrated in FIG. 1, e.g., wheels, a hood, a cargo box disposed on the frame assembly 54 and other components. But for simplicity of illustration these other components are not shown. The vehicle assembly 50 includes a frame assembly 54 that includes frame members, such as a first longitudinal frame member 54A and a second longitudinal frame member 54B. The frame assembly 54 can be or can form a portion of a chassis. The vehicle assembly 50 can include a cab 56 rigidly coupled to the frame assembly 54. The vehicle assembly 50 can include an articulating connection between the cab 56 and a rear portion the frame assembly 54 in other embodiments. The cab 56 can be disconnectable from the rear portion, e.g., as in a tractor-trailer configuration. Many other vehicle assembly 50 can form an environment for deploying examples of systems disclosed herein.

FIG. 1 shows a perspective view in which a battery assembly 100 is coupled with the frame assembly 54. The battery assembly 100 can be mounted to the frame assembly 54 across a central longitudinal axis A1 (see FIG. 2) of the frame assembly 54. FIG. 2 shows that in some examples, the battery assembly 100 is elongate along a longitudinal axis A2. The battery assembly 100 can have a first set of sides that are parallel to the longitudinal axis A2 and a second set of sides that are transverse to the longitudinal axis A2. The first set of sides can be long sides of the battery assembly 100. The battery assembly 100 can be configured such that either of the sides parallel to the longitudinal axis A2 can be forward or rearward facing on the vehicle assembly 50 when applied. The battery assembly 100 can be configured such that either of the sides transverse to the longitudinal axis A2 can be on a driver side or a passenger side of the vehicle assembly 50 when applied. The battery assembly 100 can be oriented transverse to the longitudinal axis A1 of the vehicle assembly 50 when coupled thereto. The battery assembly 100 can be generally symmetrical about an axis perpendicular to the longitudinal axis A2 (e.g., an axis central to the battery assembly 100 or equidistant from the end portions thereof). In some cases, only one of the first set of sides has electrical connections, as can be seen by comparing the top of FIG. 4 to the bottom thereof and as described in more detail below. Symmetry to the longitudinal axis A2 provides that at least some of the connection features, e.g., the coolant connections, can be located in the same position regardless of which of the vertical faces across the long direction of the battery assembly 100 is forward facing. The battery assembly 100 can be symmetrical to the longitudinal axis A1 of the vehicle assembly 50 when the battery assembly 100 is mounted to the vehicle assembly 50. The symmetry about the longitudinal axis A1 evenly distributes the weight of the battery assembly 100 on the frame assembly 54. This enables a mounting system for connecting the battery assembly 100 to the vehicle assembly 50 to include the same or similar components on both sides of the longitudinal axis A1.

FIGS. 1 and 2 illustrate at least three manners in which a modular electric vehicle system can be provided. Such a modular system can include the battery assembly 100. FIG. 1 shows that the vehicle assembly 50 can also have coupled therewith a front end accessory component assembly 104. The front end accessory component assembly 104 can be a system that can be mounted in a front end compartment 58 of the vehicle assembly 50. The front end compartment 58 can be of the same or a similar configuration as is provided in a combustion engine vehicle. That is, the front end compartment 58 can be or can include a space or a volume that is enclosed by the chassis of the vehicle assembly 50 and by a hood (now shown for clarity). The volume and general form of front end compartment 58 can be configured for an internal combustion engine. The front end accessory component assembly 104 can be shaped to occupy approximately the same volume or less volume than is occupied by the conventional internal combustion engine for which the vehicle assembly 50 was originally constructed. Said another way, the chassis including the frame assembly 54 and the front end compartment 58 can be originally designed for or can be compatible with an internal combustion engine, but can be diverted in manufacturing to an assembly including the front end accessory component assembly 104. This enables the end customer to elect between internal combustion engines and electric motor propulsion of the vehicle. Some customers may require both propulsion types but may desire the same overall vehicle configuration for other systems and subsystems. Thus, the electric vehicle systems disclosed herein advantageously do not require a custom chassis or front end compartment 58.

The front end accessory component assembly 104 can be configured to mount within the front end compartment 58 with some minimal modifications. For example, the front end accessory component assembly 104 can be coupled with brackets that can mount in convenient locations within the front end compartment 58. Such locations may be predefined by the manufacturer of the vehicle assembly 50 or may be provided by the installer, for example drilling holes in the chassis as needed. In some embodiments, such brackets can be coupled near or even directly on existing engine mounts that are provided for a conventional combustion engine. The mounts that would otherwise support the engine can be used to support one or more support brackets coupled with the front end accessory component assembly 104 in some applications.

Figure 3:
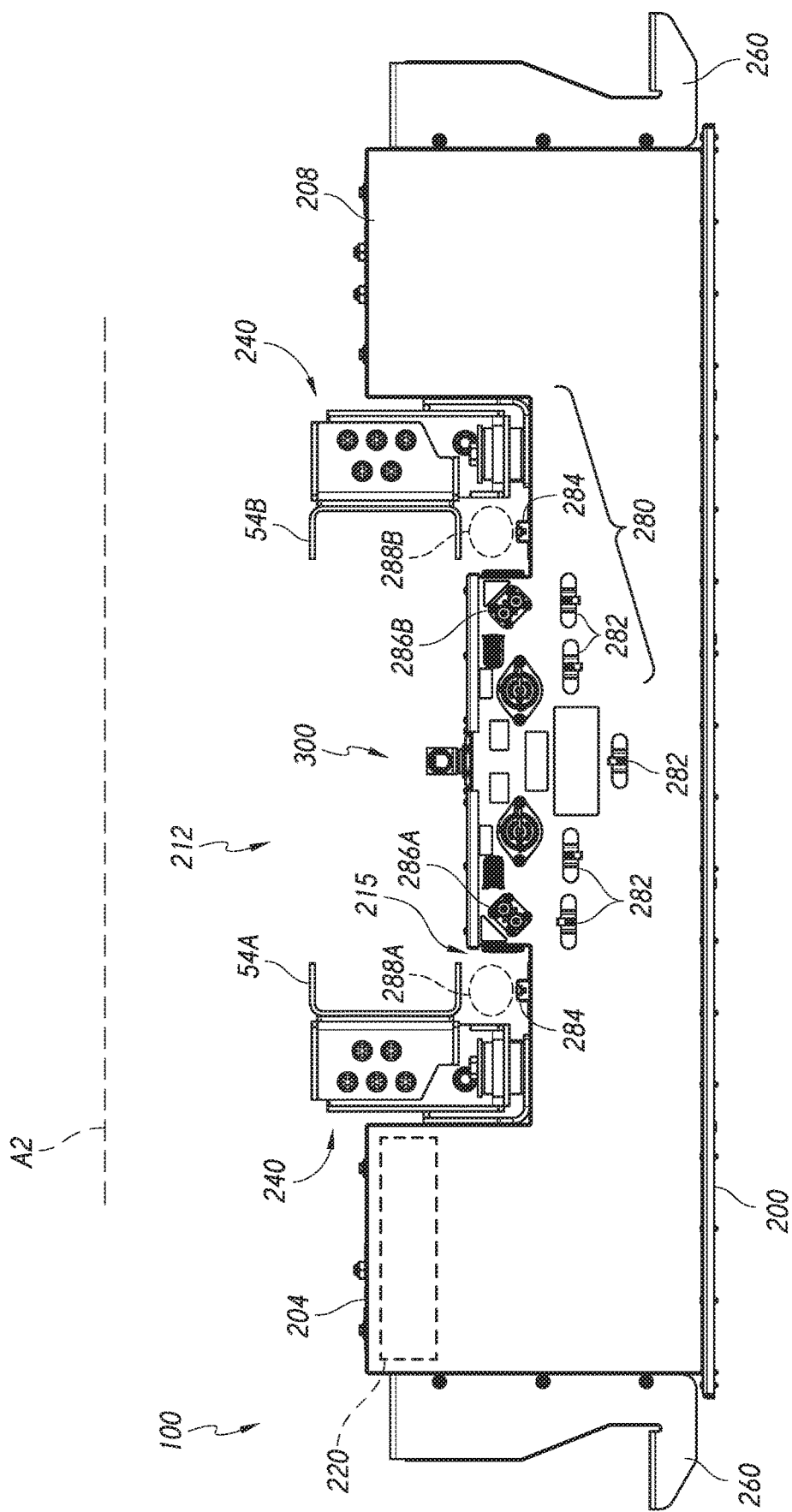
FIG. 3 is a front or rear side view of one example of a battery assembly, shown mounted to longitudinal frame members of a frame assembly of the vehicle assembly of FIG. 1.

A modular system can combine the battery assembly 100 and the front end accessory component assembly 104 which can be placed in communication with each other, as discussed further below. A modular system can combine the battery assembly 100 and a rear end electric component assembly 108 which can be placed in communication with each other, as discussed further below. A modular system can combine the battery assembly 100 and an axle drive assembly 112 which can be placed in communication with each other. A modular system can combine a front end accessory component assembly 104 and a rear end electric component assembly 108 in some embodiments. A modular system can include any two or more of the battery assembly 100, the front end accessory component assembly 104, the rear end electric component assembly 108, and the axle drive assembly 112. Further modular systems can be provided by configuring the battery assembly with separable components, e.g., at lateral portions and/or in central portions as shown in FIGS. 3B-3C.

The position of various components of these modular systems can be varied from one model to another. For example, the battery assembly 100 can be mounted to a location of the frame assembly 54 that is rearward of the cab 56 as in the vehicle assembly 50 (as in FIG. 1) or to a location of the frame assembly 54 that is at least partially below the cab 56 as in the vehicle assembly 50A (as in FIG. 13). Positioning the battery assembly 100 at least partially beneath the cab 56 can advantageously allow the step assembly 260 to be located closer to the entry point of the cab 56 than the location seen in FIG. 1. The location of the step assembly 260 shown in FIG. 13 eases entry into the cab 56.

A. Modular Battery and Front End Accessory Component Assemblies

The front end accessory component assembly 104 can include a frame 800 that is configured to mount to the chassis of the vehicle assembly 50 in the front end compartment 58. The frame 800 advantageously enables a common chassis that is design to support an internal combustion engines to be equipped with electrical power systems. The frame 800 preferably can be coupled with a mount features, e.g., plate(s), bracket(s), or rib(s) that are located in space to be positionable at, adjacent to or on a surface of the chassis or even in some applications directly on engine mount portions of the chassis in the front end compartment 58. If placed on the surface of the chassis, the plate(s), bracket(s), or rib(s) can be secured at pre-existing holes or at holes that are formed in the chassis for the front end accessory component assembly 104. The overall volume and shape as well as the mount features coupled to the frame 800 enable the front end accessory component assembly 104 to be directly placed in the front end compartment 58 and coupled to the chassis of the vehicle assembly 50 without significant or any modification of the structure surrounding the front end compartment.

The front end accessory component assembly 104 also can have one or more vehicle accessories coupled therewith so that when the frame 800 is coupled to the frame assembly 54, the accessories are simultaneously mounted to the frame assembly 54 or other chassis component at the same time that the frame 800 is mounted thereto. The front end accessory component assembly 104 can include a first vehicle accessory 804 that can be a heat exchanger, such as a chiller for controlling the temperature of coolant within an acceptable operational range. The heat exchanger 804 can include and/or be in fluid communication with fluid conduits that can be disposed between the front end accessory component assembly 104 and the battery assembly 100. The coolant conduits are configured to convey cooling fluid or coolant from the heat exchanger 804. As discussed above, the symmetry of the battery assembly 100 about the longitudinal axis A2 enables such conduit(s) to be fluidly coupled to either side of the battery assembly that is parallel to the longitudinal axis A2 such that the battery assembly can have two equivalent positions about a vertical axis. In some variations, the battery assembly 100 has a dedicated front side and the cooling fluid conduits can be connected such that upstream (cooler) portion of a cooling loop connects to the front side of the battery assembly 100. In other variations, a battery assembly 100 with a dedicated front side can be connected such that upstream (cooler) portion of a cooling loop connects to the rear side of the battery assembly 100.

The front end accessory component assembly 104 can include a second vehicle accessory 808 that serves a different function from the first vehicle accessory 804. For example, the second vehicle accessory 808 can include an electrical accessory such as a fluid pump to convey coolant from the heat exchanger 804 of the front end accessory component assembly 104 to the battery assembly 100. The second vehicle accessory 808 could be one or more of an air compressor, a current driven component, a controller for a thermal system, a power steering fluid pump, a heater core, a voltage converter, a fan, power distribution unit for high voltage uses, power distribution unit for low voltage uses, and any other sort of controller that receives electric current or that controls an aspect of the operation of the battery assembly 100 or another electrical component. The first vehicle accessory 804 and the second vehicle accessory 808 could both be electrical components such as those listed above or elsewhere herein. The first vehicle accessory 804 and the second vehicle accessory 808 could both be thermal management components, such as heat exchangers in some applications.

As explained in greater detail below, the modular electric vehicle system shown in FIGS. 1-2 combines the front end accessory component assembly 104 and the battery assembly 100 such that front end accessory components can be placed in electrical communication and/or in fluid communication with the battery assembly 100. In some variations modular systems combine the front end accessory component assembly 104 and the rear end electric component assembly 108 such that thermal management, current supply or component control can be coordinated among these assemblies. Modular systems can combine the battery assembly 100 with one or more of the front end accessory component assembly 104, the rear end electric component assembly 108, or the axle drive assembly 112.

FIG. 2 illustrates that in another sense a modular system can be provided with two or more battery assemblies 100. The battery assembly 100 in solid lines is shown to be augmented by a second battery assembly 100 in dashed lines. The second battery assembly 100, illustrated in dashed line, can be located behind a first battery assembly 100. The battery assemblies 100 can be mounted in a linear array along the longitudinal axis A1 of the vehicle assembly 50. Although not shown in FIG. 2, a location for a second or subsequent battery assembly 100 can be forward of the location of the solid line battery assembly 100. A forward location can be directly under the cab 56 in a modular system with one, two, or more than two battery assemblies 100. When disposed directly under the cab 56 (as in FIG. 13) the battery assembly 100 can advantageously have one or more steps directly mounted thereon to enable a driver or passenger to enter or exit the cab 56. As discussed further below a lower step and an upper step can be integrated into a step assembly that is supported directly by a housing of the battery assembly 100 to enable battery units in the battery assembly 100 and the step assembly to be simultaneously attached to the frame assembly 54 to make the assembly of the modular system or of the battery assembly 100 to the vehicle assembly 50 more efficient for the end user. In some cases, modular systems can be formed from a small number of variants of the battery assembly 100, such as providing one or more battery assembly 100 with one or more steps and one or more battery assembly 100 without steps, which variant can be combined in a system based on the need for or the positions of steps. Mounting the steps directly on the battery assembly 100 can enable the vehicle assembly 50 to have a smaller lateral profile by eliminating separate support members to support the steps.

In another modular system, the front end accessory component assembly 104 is not provided. Instead front end accessories are mounted in another manner, e.g., separately within the front end compartment 58 or elsewhere at other locations of the vehicle assembly 50. A modular system can include one or more battery assemblies 100 and the rear end electric component assembly 108. A modular system can include a plurality of battery assemblies 100 to provide for greater range from a fully charged condition to a fully depleted condition than in a system with only one battery assembly 100. The battery assemblies 100 are advantageously configured for flexible connection to the vehicle assembly 50, e.g., in a forward facing direction on the frame assembly 54 or in a rearward facing direction on the frame assembly 54. In some cases, one of the battery assembly 100 can be forward facing and another can be rearward facing. The battery assembly 100 can be symmetrical such that forward and rearward facing mounting includes providing the longitudinal axis A2 transverse to, e.g., perpendicular to the longitudinal axis A1. The battery assembly 100 can be asymmetrical as to system connections, e.g., with dedicated coolant inflow manifolds such that forward facing provides a dedicated inflow manifold side of the battery assembly 100 forward of a dedicated fluid outflow manifold when installed on the frame assembly 54. The battery assembly 100 can be asymmetrical as to electrical connection such that the power cables are only attached at one side of the battery assembly 100.

The flexibility in connection fosters a modular system that can allow the battery assembly 100 to be mounted to the frame assembly 54 as space permits. The symmetry of the battery assembly 100 about the longitudinal axis A1, when provided, allows the battery assembly 100 to have the same weight balance regardless of which of the long faces is forward facing when the battery assembly 100 is installed on the frame assembly 54. In some cases, heat transfer systems of the battery assembly 100 allow fluid to deliver coolant to a coolant flow path in the battery assembly 100 from either of two manifolds at the ends of the coolant flow paths. This can allow the end user to determine whether to dedicate a shorter coolant conduit to the cooler side or to the hotter side of the battery assembly 100. A longer conduit on the hotter side of the battery assembly 100 may enable some heat to dissipate before entering a heat exchanger, which could enable a smaller or less costly heat exchanger to be used.

B. Battery Assembly Having a Mounting System with Enhanced Load Isolation

FIGS. 3-8 show examples of how the battery assembly 100 can be coupled with the frame assembly 54, e.g., with the first longitudinal frame member 54A and/or the second longitudinal frame member 54B. The battery assembly 100 can have a mounting system 240 that can be configured to support the battery assembly 100 from these or other frame members of a chassis or frame assembly 54 of the vehicle assembly 50.

In one embodiment, the battery assembly 100 includes a housing 200 that encloses one or more battery units 220 therein. The housing 200 can have a W-shaped or gull-wing shape configuration. The W-shape of the housing 200 can include a first lateral portion 204 and a second lateral portion 208. The second lateral portion 208 can be separated from or spaced apart from the first lateral portion 204 by a central portion 212 of the battery assembly 100. FIG. 3 shows that the central portion 212 of the housing 200 can be include a recessed surface, e.g., when viewed from a rear or front side of the battery assembly 100. Stated another way, the central portion 212 provides an upwardly oriented concavity or space between one or both of the first lateral portion 204 and second lateral portion 208 and the central portion 212. The central portion 212 is one of the locations of the battery assembly 100 where the battery unit(s) 220 are disposed within the housing. The battery units 220 can also be in the first lateral portion 204 or the second lateral portion 208 of the housing 200. In one embodiment a further recess 215 can be provided between the central portion 212 and the first lateral portion 204. A recess 215 can be positioned between the central portion 212 and the second lateral portion 208. A recess 215 can be provided between the central portion 212 and each of the first lateral portion 204 and the second lateral portion 208 in a symmetrical configuration. The central portion 212 can be omitted in some embodiments, such as where a U-shaped housing is provided (see, e.g., FIGS. 3A and 3B discussed below), or can be optionally provided in a modular system (see, e.g., FIG. 3C discussed below). One or both of the first lateral portion 204 and the second lateral portion 208 can optionally be provided in a modular system, such that a flat housing, a U-shaped housing (see, e.g., FIG. 3B) or a modular formed W-shaped housing (see, e.g., FIG. 3C) can be provided.

The housing 200 is configured to be exposed to the road beneath the vehicle when the battery assembly is coupled to the vehicle assembly 50. The battery assembly 100 can be mounted to the bottom or underside of the chassis or frame assembly 54 of the vehicle assembly 50. This configuration allows the battery assembly 100 to be quickly attached to and removed from the vehicle assembly 50 as needed. This design facilitates exchanging the battery assembly 100 upon depletion of the charge therein rather than recharging the battery assembly, which provide a more rapid redeployment of the battery assembly 100 for longer haul uses.

FIG. 3 shows that in one example, the mounting system 240 disposed at least partially between the first lateral portion 204 and the second lateral portion 208, e.g., is disposed adjacent to or within the concavity on a top side of the battery assembly 100. The housing 200 can have an upper surface 214 that extends over the central portion 212. The further recess 215 can be located along the upper surface 214 on one or both sides of the central portion 212 which can be raised relative to the recess 215. The central portion 212 can have lesser height than the first lateral portion 204 and/or the second lateral portion 208 in one example. In another example, the central portion 212 can have a greater height, e.g., if clearance between the first longitudinal frame member 54A, second longitudinal frame member 54B is sufficient. The recess 215 enables at least a portion of the height of the mounting system 240 to be disposed at a lower elevation than the central portion 212. The recess 215 can enable the location for mounting to the first longitudinal frame member 54A or second longitudinal frame member 54B to be below the first lateral portion 204 and/or second lateral portion 208. In some embodiments, the recess 215 has a lateral width (in the direction of the longitudinal axis A2) that is greater than the lateral width of the mounting system 240 and of the first longitudinal frame member 54A and/or second longitudinal frame member 54B. This allows even the first longitudinal frame member 54A or second longitudinal frame member 54B to be received at or even at least partially below the top of the central portion 212. A lower portion of the frame assembly 54 can be located at the same height as the upper surface 214 of the housing 200 in the central portion 212. Where space permits the central portion 212 can extend above a lower portion of the frame assembly 54 such that additional battery units or other components can be disposed in the housing 200 of the battery assembly 100.

Figure 4:
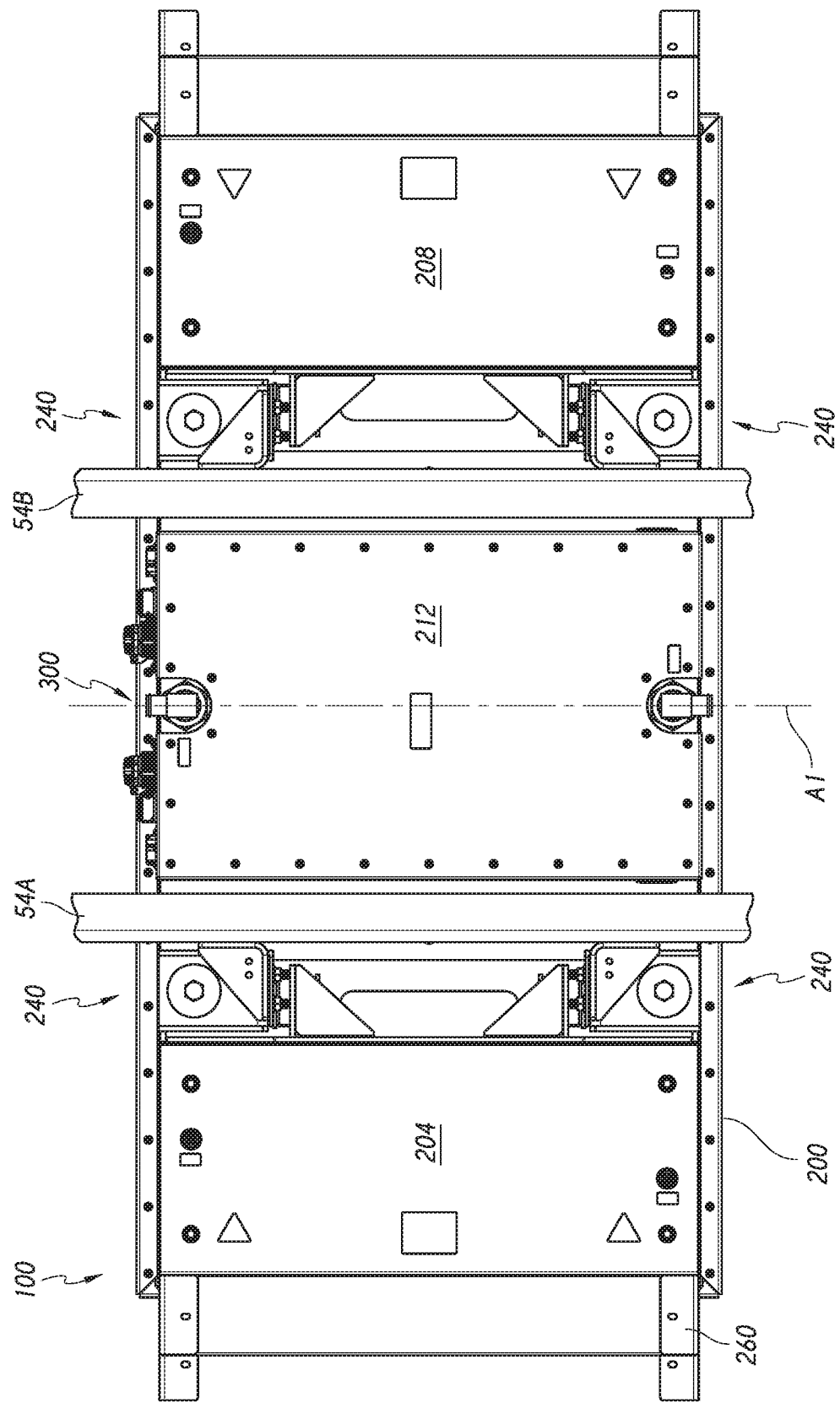
FIG. 4 is a top view of the battery and vehicle frame member assembly of FIG. 3.
Figure 4A:
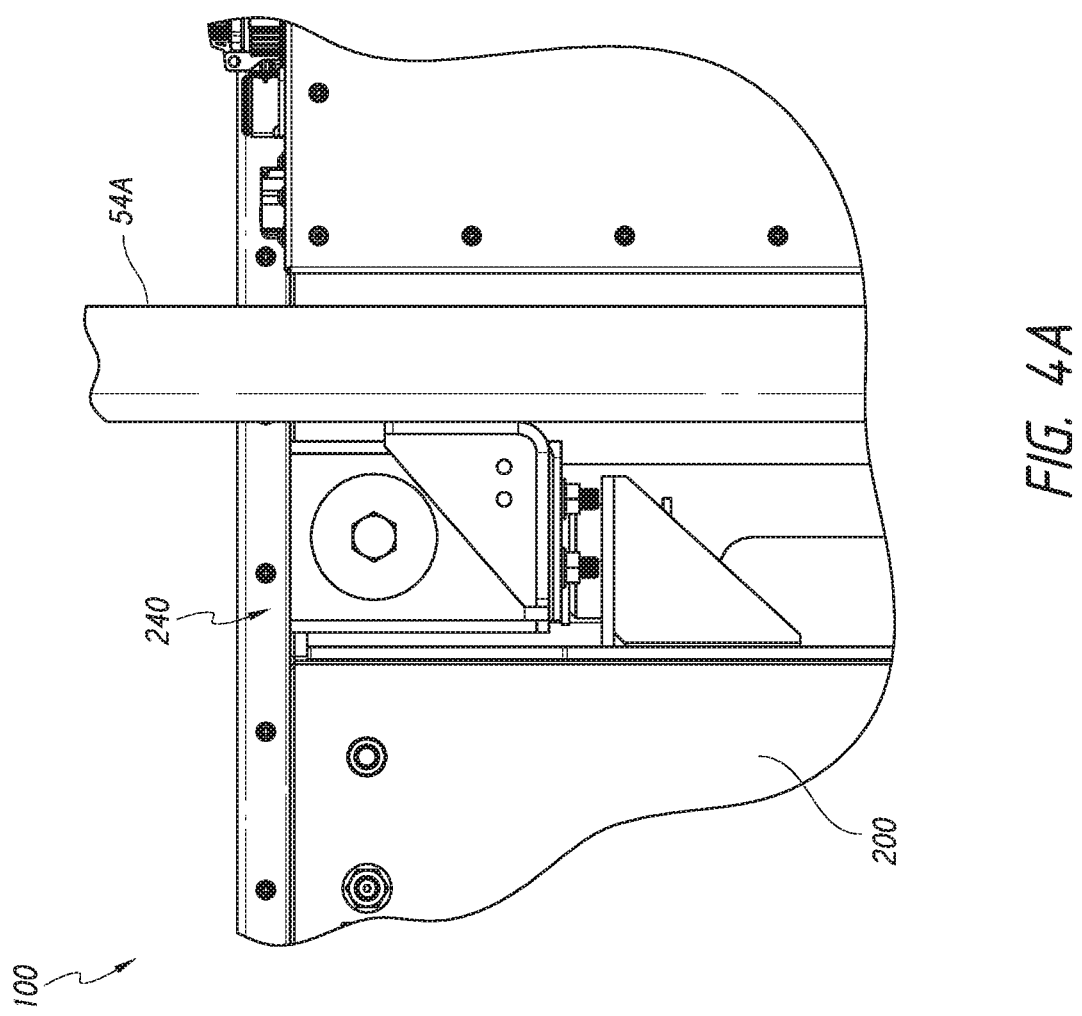
FIGS. 4A-4E illustrate details of a process of coupling the battery assembly to longitudinal frame members of a frame assembly of a vehicle and for routing electrical conveyances between the battery assembly and other vehicle electrical assemblies.

FIG. 4 is a partial top view of an assembly including the frame assembly 54 and the battery assembly 100. The assembly shows that the first longitudinal frame member 54A can extend along the direction of the longitudinal axis A1. The first longitudinal frame member 54A can be located inboard of two mounting systems 240, one located at a forward part of the battery assembly 100 (top of the figure) and one located at a rearward side thereof (bottom of the figure). In this context, inboard means between the mounting system 240 and the longitudinal axis A1 of the vehicle assembly 50. The mounting system 240 can be located outboard of the first longitudinal frame member 54A. In this context outboard means that the component that is outboard is located farther from the longitudinal axis A1 than the other component. The mounting systems 240 can be located between the first lateral portion 204 and the first longitudinal frame member 54A when the battery assembly 100 is assembled to the vehicle assembly 50. Similarly, two mounting systems 240 can be located between the second lateral portion 208 and the longitudinal axis A1 of the vehicle assembly 50. The second longitudinal frame member 54B can be disposed inboard of (toward the axis A1) the mounting systems 240. The mounting system 240 can be located outboard of (away from the axis A1) the second longitudinal frame member 54B. Of course more than two mounting system 240 can be provided for a given battery assembly 100. In some cases, the battery assembly 100 can be supported by a single mounting system 240. The longitudinal frame members 54A, 54B can extend between the mounting systems 240 and the central portion 212.

Figure 4B:
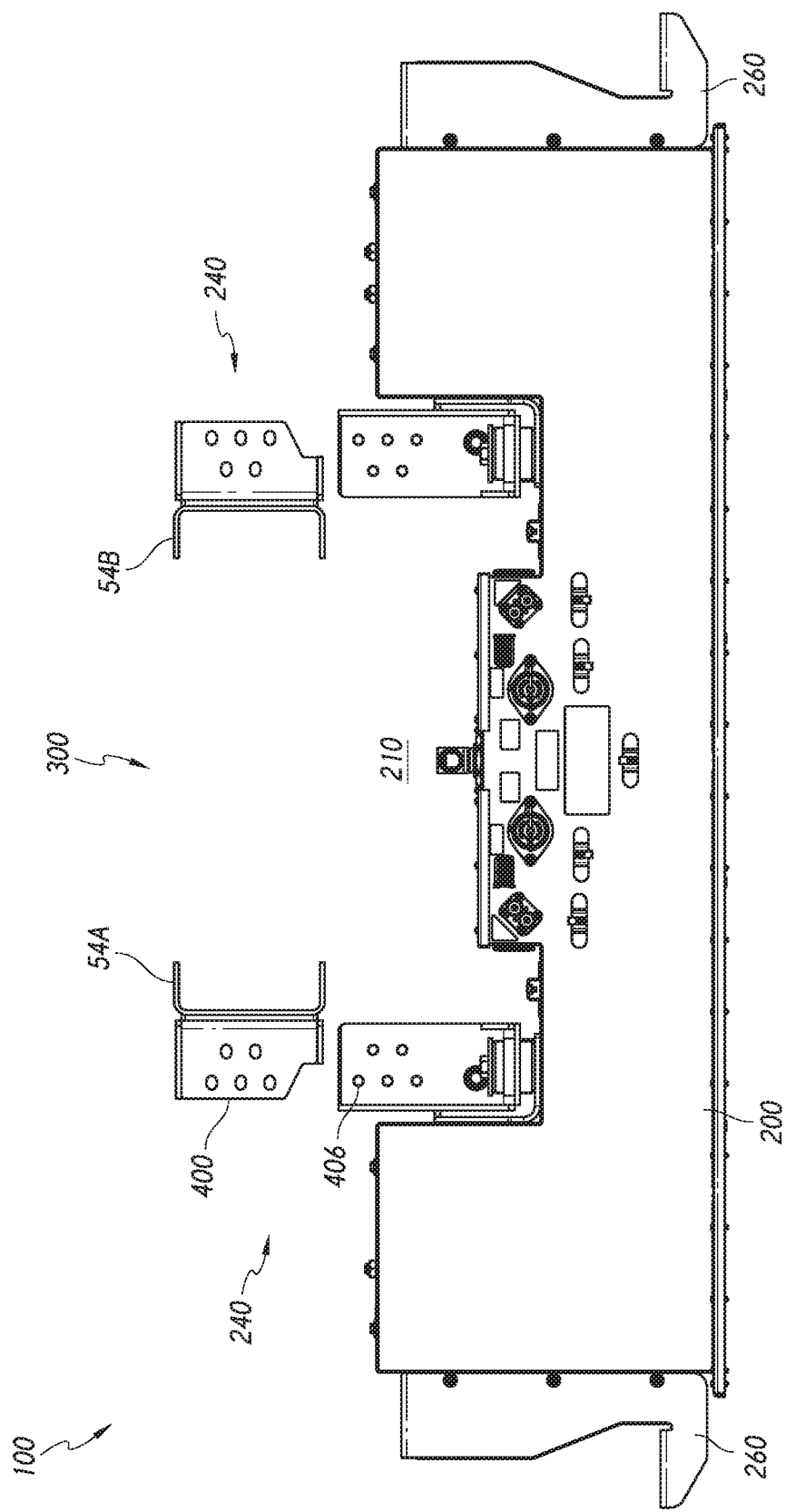
Figure 4C:
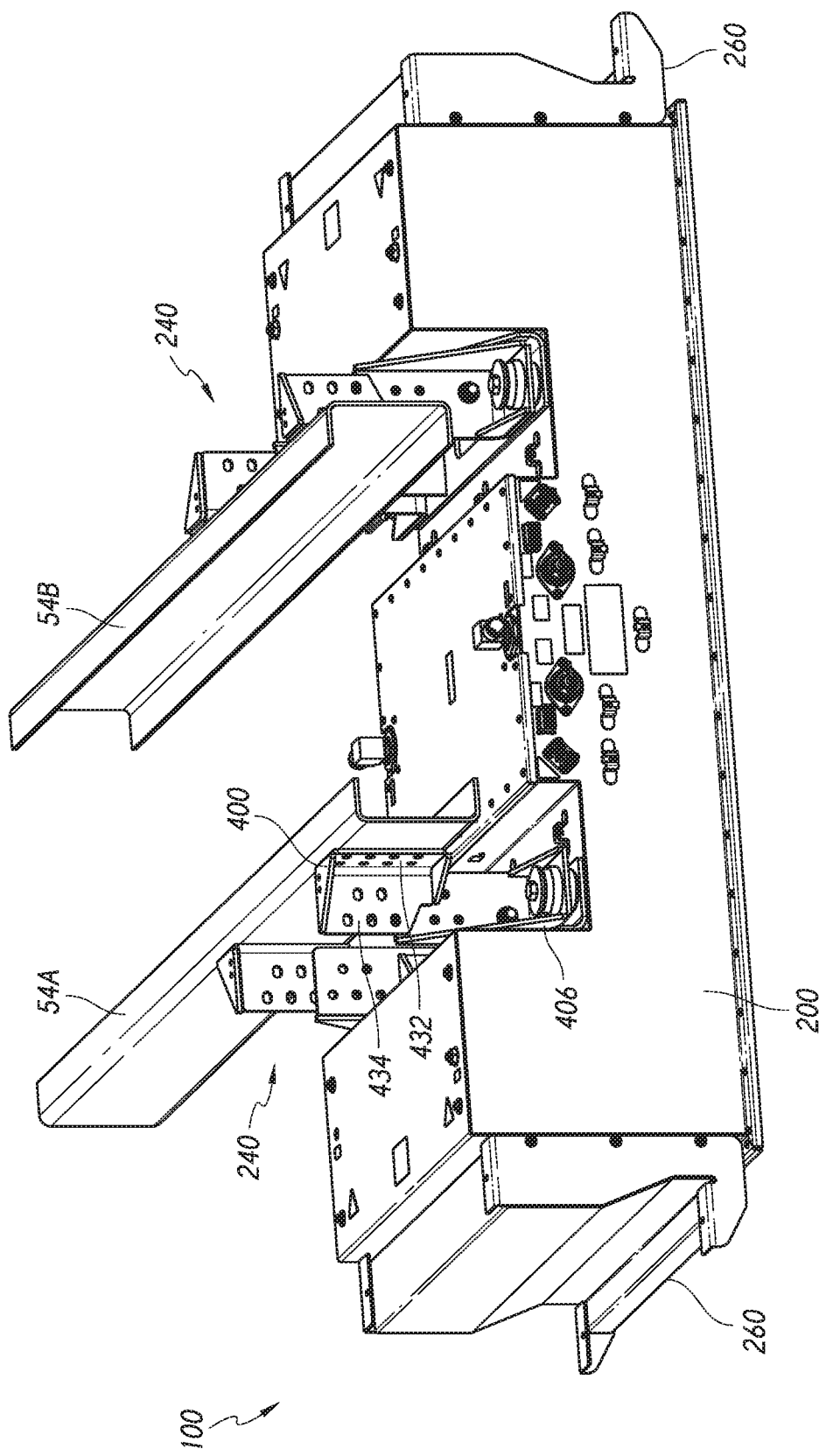

FIGS. 4B and 4C show that the mounting system 240 further includes a frame member bracket 400 and a housing bracket system 402. The frame member bracket 400 is configured to connect to a frame member (e.g., a portion of a chassis) of a vehicle, such as the first longitudinal frame member 54A or the second longitudinal frame member 54B. The frame member bracket 400 can include a mounting hole, an array of mounting holes. In some examples, the frame member bracket 400 includes two or more arrays of mounting holes. FIG. 4C shows that the frame member bracket 400 can include a first array of holes on an inboard side 432 of the frame member bracket 400. The inboard side can be a side that faces the first longitudinal frame member 54A, for example, and is directed coupled to an outboard side thereof. One or more, e.g., all of a plurality of holes of the holes of the array of holes on the inboard side 432 of the frame member bracket 400 can align with one or more, e.g., all of a plurality of holes on the first longitudinal frame member 54A. When so aligned bolts or other fasteners can secure the inboard side 432 of the frame member bracket 400 to the first longitudinal frame member 54A. The frame member bracket 400 can be configured to mount to the housing bracket system 402 as discussed further below. For example, the frame member bracket 400 can have a transverse side 434 extending transversely away from the inboard side 432. The transverse side 434 can be outboard of the inboard side 432 in one embodiment. The transverse side 434 of the frame member bracket 400 can have one or more or an array of holes disposed therethrough to secure a portion of the housing bracket system 402 thereto as discussed further below.

Figure 6:
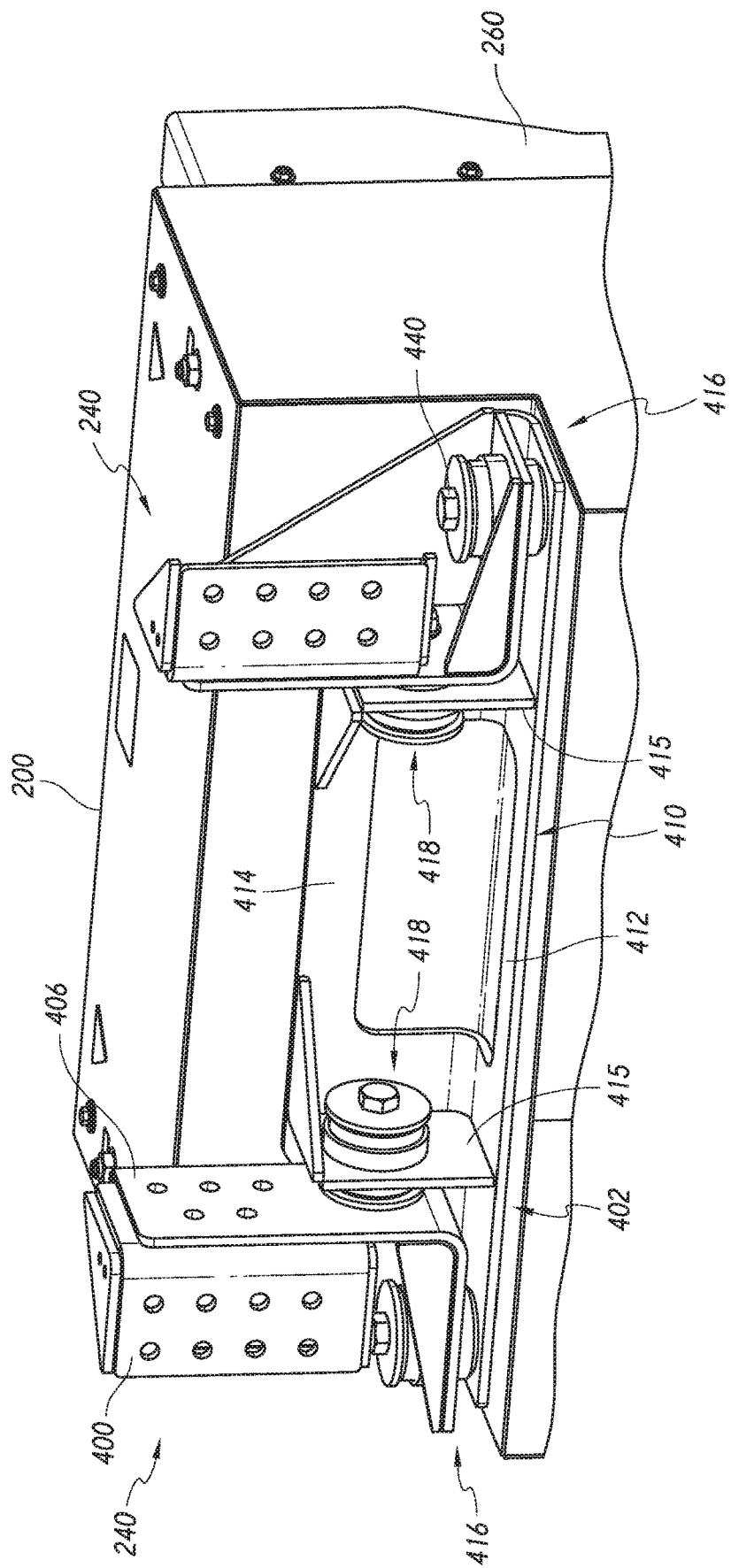
FIGS. 6-7 are perspective and side views of a battery assembly showing details of a mounting system for supporting the battery assembly on a frame assembly.

The housing bracket system 402 is configured to support the weight of the battery assembly 100 through a housing bracket 406 when the housing bracket is coupled to the frame assembly 54 or other structural component of a chassis. The housing bracket 406 can be coupled to the frame assembly 54 by way of the bracket 400, discussed above. The housing bracket system 402 also is able to carry and to at least some extent absorb loads applied thereto through the frame assembly 54 and the frame member bracket 400. The housing bracket system 402 can dampen such loads such that less than the entirety of such loads are transferred to the housing 200 and to the battery units 220 disposed therein. The housing bracket system 402 is coupled with the housing 200. In one embodiment, the housing bracket system 402 includes a load member 410 that can be coupled with the housing 200. The load member 410 can include a plurality of portions adapted to support functionally separate components of the housing bracket system 402. The load member 410 can include a first portion 412 configured to contact the upper surface 214 of the housing 200 and to be held thereon by a fastener system of a first vibration isolator 416. FIG. 6 shows that opposite ends (e.g., forward and rearward ends) of the load member 410 can each be held by a fastener 440 of a first vibration isolator 416. The load member 410 can be configured to convey loads from the first vibration isolator 416 and from a second vibration isolator 418 to the frame member bracket 400 and thereby to the frame assembly 54. The load member 410 can also include a second portion 414 that is angled relative to the first portion 412. The angled configuration increases the stiffness of the load member 410 which enables the load member 410 to support the loads from the two second vibration isolators. The second portion 414 also extends to a height to support a second vibration isolator 418 at an elevation above the first portion 412.

The load member 410 also includes a isolator support portion 415 that is disposed between the first portion 412 and the second portion 414. The isolator support portion 415 provides an upright member to which the second vibration isolator 418 can be secured, as discussed further below. The isolator support portion 415 also includes a transverse portion to connect to the second portion 414. The isolator support portion 415 can formed from the load member 410 or can be welded thereto The load member 410 can be made of a highly rigid material, such as structural steel. The load member 410 can be openings therein to reduce its weight where load support is not needed. For example, the load member 410 also includes an opening between two opposing isolator support portions 415.

Figure 7:
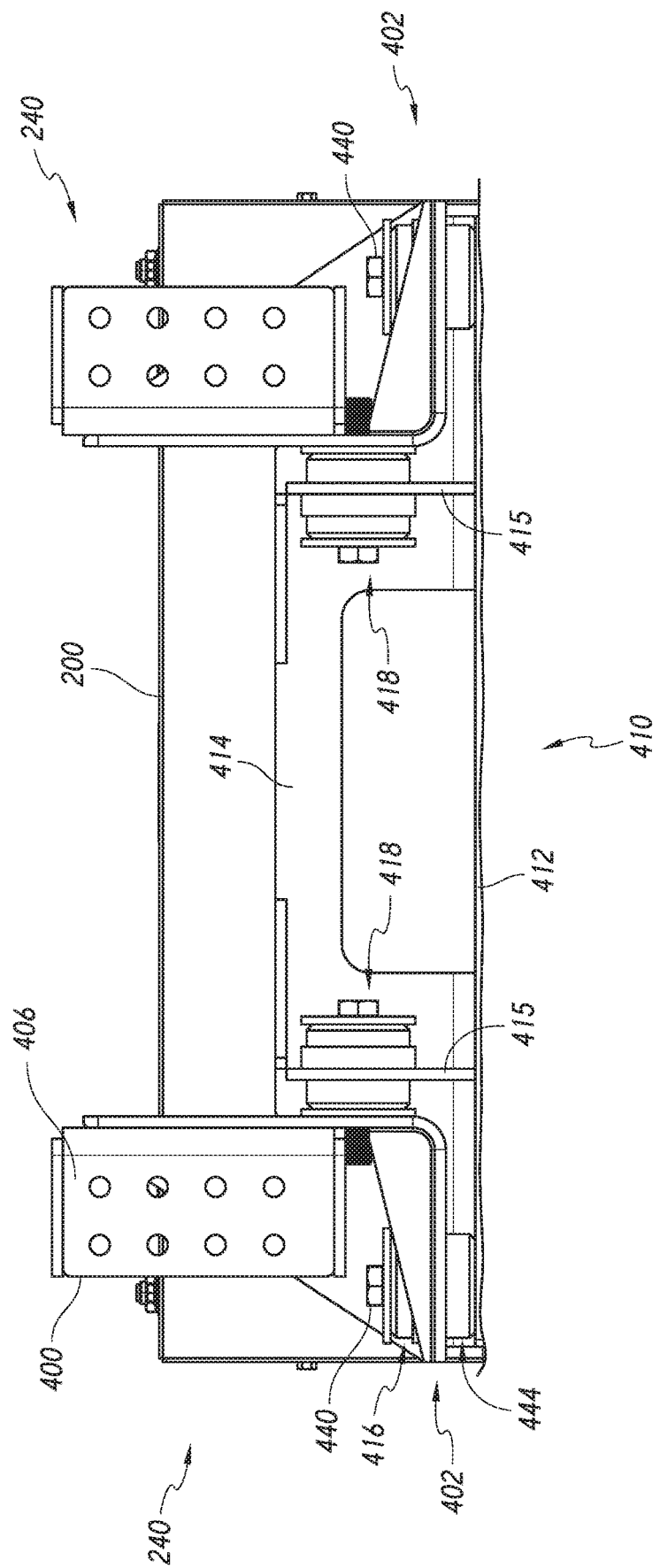

FIGS. 6-7 show that the load member 410 can support two housing bracket system 402, one at a first side portion of the housing 200 and one at a second side opposite the first side. The first side can be a front side of the housing 200 in one application. The second side can be a rear side of the housing 200. As discussed above, the battery assembly 100 can be symmetrical about the longitudinal axis A2 such that the first side can be a rear side and the second side can be a front side in one application. The function of the load member 410 could be separated into two separate members in some examples. By providing a single unitary load member 410 the fastener 440 of the housing bracket system 402 adjacent to the first side and the fastener 440 of the housing bracket system 402 adjacent to the second side can be sufficient to securely connect the load member 410 to the housing 200.

Figure 8:
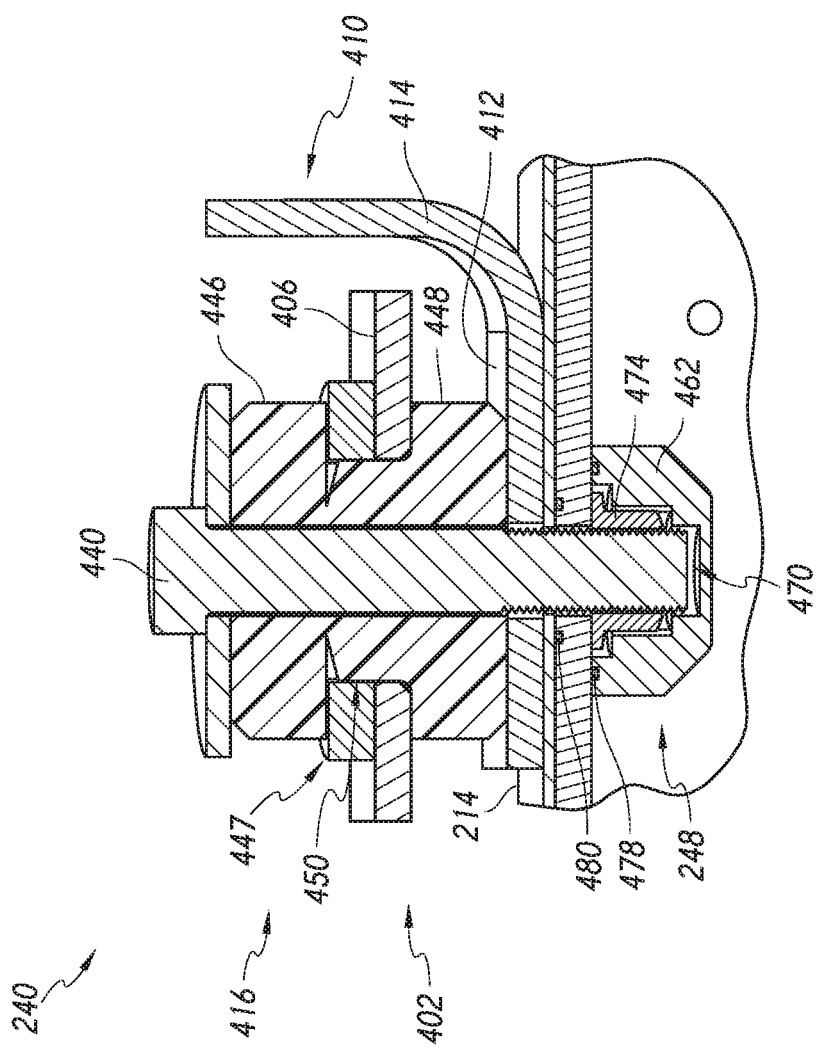
FIG. 8 is a cross-sectional view of a portion of the mounting system of the battery assembly of FIG. 5 taken at the section plane 8-8.

As discussed above, the mounting system 240 can also include a first vibration isolator 416. The first vibration isolator 416 is configured to reduce vertical load transmission from the frame member 54A, 54B of the vehicle assembly 50 to the housing 200. The first vibration isolator 416 can take many forms to provide this function. FIG. 8 illustrates one example in cross-section. The first vibration isolator 416 includes a compressible element 444 that can be made of a compressible but resilient material, such as rubber. Other harder materials can be used if high load transmission is acceptable, e.g., if further vibration isolation is provided between the mounting system 240 and the battery units 220. The compressible element 444 can include an upper portion 446, a lower portion 448, and a neck portion 450. The compressible element 444 can be configured with a disk or annular shape and generally is wider (in the horizontal direction) than is its thickness (in the vertical direction). The lower portion 448 can have a similar shape to the compressible element 444. The neck portion 450 can be a portion with a narrower dimension in the horizontal direction than is one or both of the compressible element 444 or the lower portion 448. The compressible element 444 can be formed as a unitary body from a top of the upper portion 446 to a bottom of the lower portion 448 in some embodiments. The compressible element 444 can have a passage or a channel through the compressible element 444 for the fastener 440 as seen in FIG. 8. The lower surface of the lower portion 448 can be placed on an upper surface of the first portion 412 of the load member 410. The housing bracket 406 can have an aperture or a recess at a lower portion thereof that allows a portion of the housing bracket 406 around the aperture or recess to be disposed in the neck portion 450 of the compressible element 444. Transverse load spreading members, such as washers, can be placed between a head portion of the fastener 440 and the top surface of the upper portion 446 and between a lower surface of the upper portion 446 and the housing bracket 406, for example. In some embodiments, a spacer 447 can be provided to space the upper portion 446 from the lower portion 448 of the first vibration isolator 416.

The housing bracket system 402 can secure the housing bracket 406 in a middle portion of the compressible element 444. The housing bracket 406 can be sandwiched between the upper portion 446 and the lower portion 448. The upper portion 446 and the lower portion 448 can mutually apply compression load to the housing bracket 406 such that the housing bracket 406 is securely held between the upper portion 446 and the lower portion 448. A vertical load (up and down in FIG. 8) will initially be absorbed by the compressible element 444 before a lesser load is transferred to the housing 200 through the anchor member 248 as described further below.

FIGS. 6-8 illustrate that the second vibration isolator 418 can be disposed between the load member 410 and the housing bracket 406. The second vibration isolator 418 can be configured to reduce horizontal load transmission from the frame member of the vehicle to the housing. The second vibration isolator 418 can have the same configuration as the first vibration isolator 416 but generally be mounted along an axis that is transverse to the axis along which the first vibration isolator 416 is mounted (e.g., transverse to the longitudinal axis of the fastener 440 shown in FIG. 8). The second vibration isolator 418 is supported on the isolator support portion 415 or another upstanding portion of the load member 410. Loads in the horizontal direction are conveyed between the frame member bracket 400 and the housing bracket 406. Generally horizontal loads (or horizontal components of loads) from the vehicle assembly 50 are conveyed to the housing 200 through the second vibration isolator 418. The first vibration isolator 416 and the second vibration isolator 418 provide a combination of separate load isolation members. The first vibration isolator 416 and the second vibration isolator 418 allow load in any direction to be axially supported, e.g., to be supported in compression or tension and not in a bending mode. This load transfer arrangement reduces twisting forces on the battery assembly 100 which can reduce failure modes. In addition to vibration isolation, the fasteners 440 through the first vibration isolator 416 provides for mounting from the battery to the frame member bracket 400 and the housing bracket 406 of the mounting system 240. In the event of a forward loading condition, such as emergency braking maneuver or crash, this additional mounting provision enables the battery assembly 100 to remain secure under heavy loading conditions.

The mounting system 240 can be secured to the housing 200 in any suitable manner. In some examples, it is preferred to maintain the ingress protection of the housing 200. The mounting of a component such as the mounting system 240 directly to the ingress protection housing 200 could provide a point of ingress of moisture, which is to be reduced, minimized or avoided. FIG. 8 shows an ingress protecting anchor member 248 that can be used to secure the mounting system 240 to the housing 200 while excluding moisture ingress routes. The anchor member 248 includes a plate member 462. The plate member 462 has a blind recess 466 formed therein. The blind recess 466 is configured to receive the fastener 440 disposed through the first vibration isolator 416. The plate member 462 includes a blind recess 470. The blind recess 470 is formed on a surface or into of the plate member 462 configured to face, e.g., to abut, an inside surface of the housing 200. The blind recess 470 includes at least one flat surface 472 configured to restrict rotation of an internally threaded member 474 (e.g., a nut) disposed therein.

Figure 9:
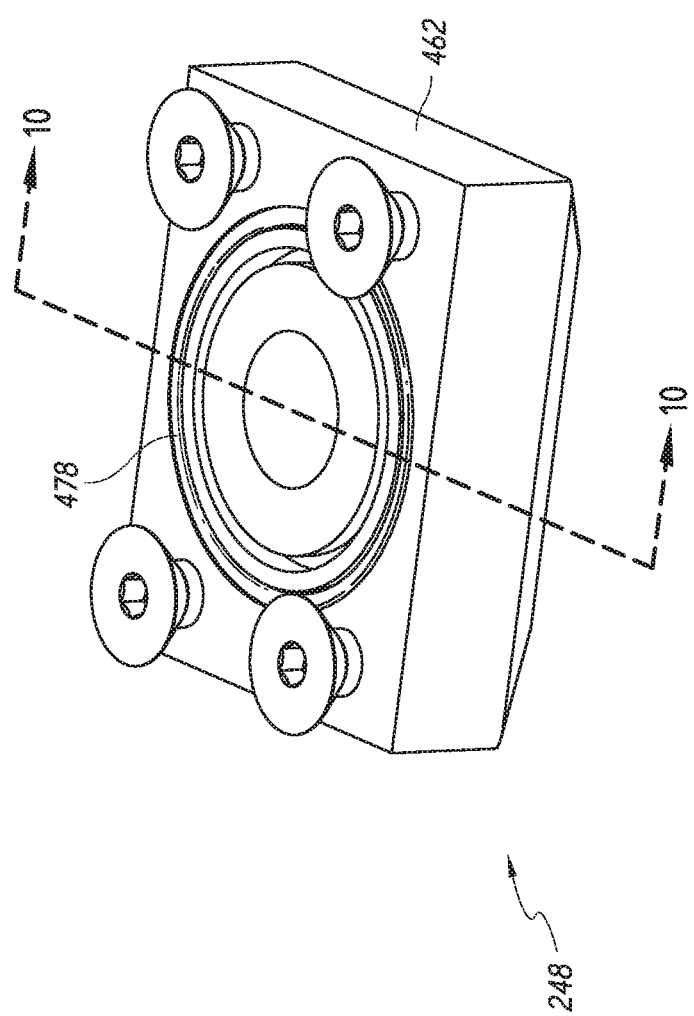
FIGS. 9 and 10 are perspective and cross-sectional views of an anchor member configured to maintain ingress protection of the housing of the battery assembly of FIG. 3.
Figure 10:
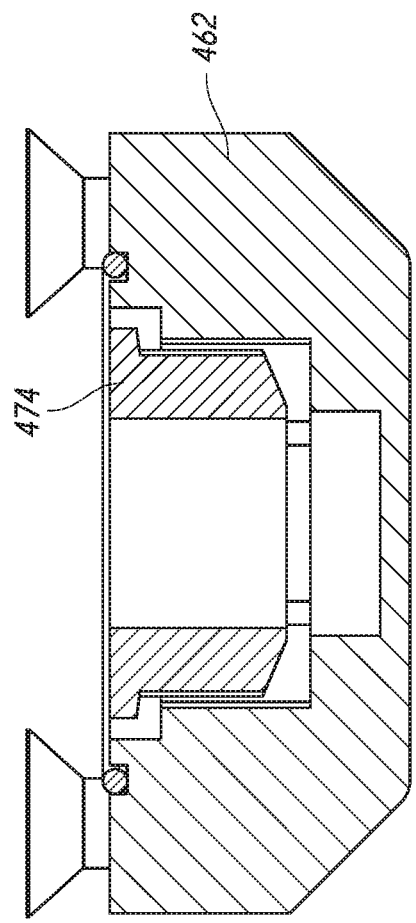

The plate member 462 can be secured to an inside of the housing 200, e.g. to a frame member therein in any suitable manner. In one case, a plurality of tapered head fasteners 476 is used to pull the top surface of the plate member 462 up into engagement with the inside surface of the housing 200. The fasteners 476 can create compression on a gasket 478 disposed in a channel in the upper surface of the plate member 462. The gasket 478 can be compressed onto an inside surface of the housing 200. The gasket 478 provides an additional measure of protection by blocking the flow or migration of any moisture from the blind recess 470 through the interface between the plate member 462 and the inside surface of the housing 200. The gasket 478 can have an annular shape as seen in FIG. 9.

Another annular gasket 480 can be provided in an interface between an upper surface 214 of the housing 200 (e.g., a cover thereof) and an internal structure (e.g., a frame member disposed below the cover), as seen in FIG. 8. The gasket 480 can limit flow of moisture into the housing 200 through the interface between a cover and a frame member of the housing 200 when the fastener 440 is tightened to the ingress preventing anchor member 248.

C. Coupling the Battery Assembly to a Frame Assembly

FIGS. 4B-4C illustrate a method of connecting the battery assembly 100 to the frame assembly 54. First, the frame member bracket 400 can be installed on the first longitudinal frame member 54A and on the second longitudinal frame member 54B. FIG. 4C shows that in some cases two frame member bracket 400 are installed on each of the first longitudinal frame member 54A and the second longitudinal frame member 54B. A forward frame member bracket 400 can be mounted such that the inboard side 432 thereof extends forwardly. A rearward frame member bracket 400 can be mounted such that the inboard side 432 thereof extends rearwardly. The transverse side 434 of the forward frame member bracket 400 can be rearward of the inboard side 432 thereof. The transverse side 434 of the rearward frame member bracket 400 can be forward of the inboard side 432 thereof.

The battery assembly 100 can be disposed beneath the frame member brackets 400 as shown in FIG. 4B and lifted into position such that the battery assembly 100 can be secured to the frame assembly 54. FIB. 4C shows the battery assembly 100 partially lifted such that the housing bracket 406 and the frame member bracket 400 are overlapping. The housing bracket 406 disposed on the battery assembly 100 can be aligned with the transverse side 434 of the frame member brackets 400. Then the battery assembly 100 can be raised into position such that the housing brackets 406 are disposed on the outboard sides of the first longitudinal frame member 54A and the second longitudinal frame member 54B. In one method, a forward housing bracket 406 and a rearward housing bracket 406 on the outboard side of the first longitudinal frame member 54A are both longitudinally between (in the direction longitudinal axis A1) the transverse side 434 of a forward frame member bracket 400 and the transverse side 434 of a rearward frame member bracket 400 mounted on the outboard side of the first longitudinal frame member 54A. Similarly, a forward housing bracket 406 and a rearward housing bracket 406 on the outboard side of the second longitudinal frame member 54B are both longitudinally between (in the direction longitudinal axis A1) the transverse side 434 of a forward frame member bracket 400 and the transverse side 434 of a rearward frame member bracket 400 mounted on the outboard side of the second longitudinal frame member 54B. In one variation, the frame assembly 54 is lowered relative to the battery assembly 100 such that the frame member bracket 400 and the housing bracket 406 are aligned. Bolts can be provided through the hole(s) or array of holes to secure the battery assembly 100 to the frame assembly 54.

The connection at the vertical faces of the frame member bracket 400 and the housing bracket 406 supports the battery assembly 100 at four spaced apart points of contact. The housing bracket system 402 provide one or more, e.g., two load isolation system or isolators that can handle loads in transverse directions, e.g., horizontal loads and vertical loads separately. This arrangement combines quick assembly, secure connection and load isolation for the battery assembly 100.

D. Electrical Conveyance Tether Systems

As discussed above, the battery assembly 100 can be integrated into a system that can include the front end accessory component assembly 104. The battery assembly 100 can be integrated into a system that can include the rear end electric component assembly 108. The battery assembly 100 can be integrated into a system that can include the axle drive assembly 112. A system of the vehicle assembly 50 can include any or all of the battery assembly 100, the front end accessory component assembly 104, the rear end electric component assembly 108, and the axle drive assembly 112.

Figure 4D:
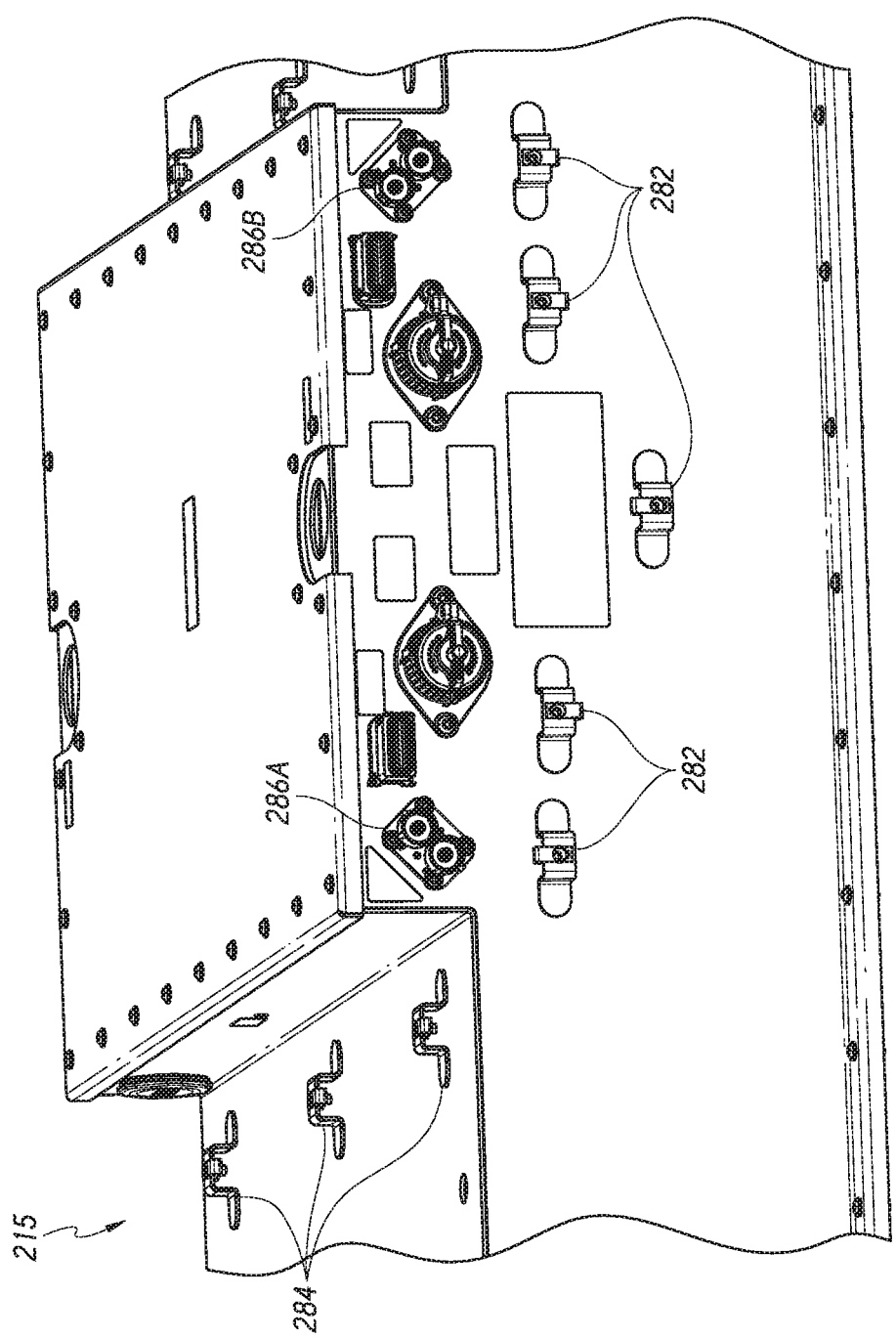
Figure 4E:
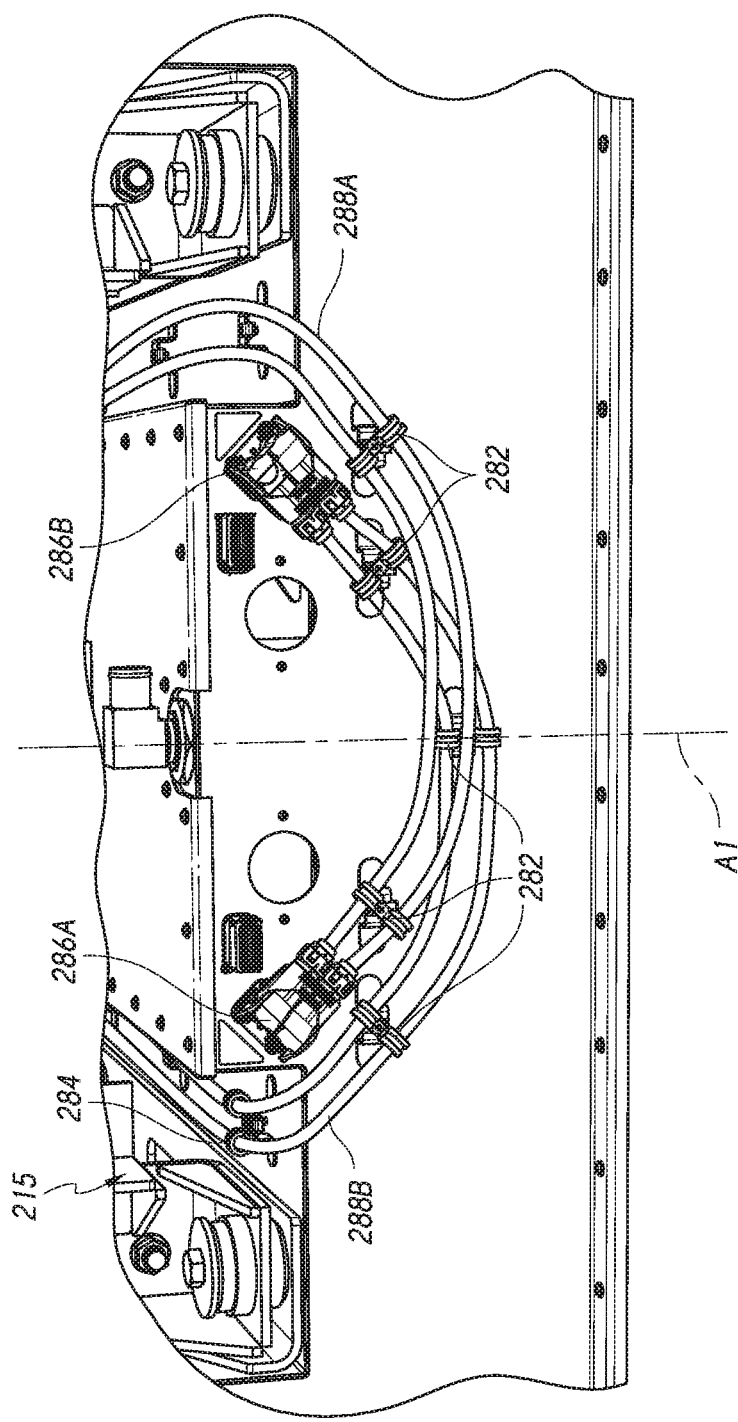
Figure 5:
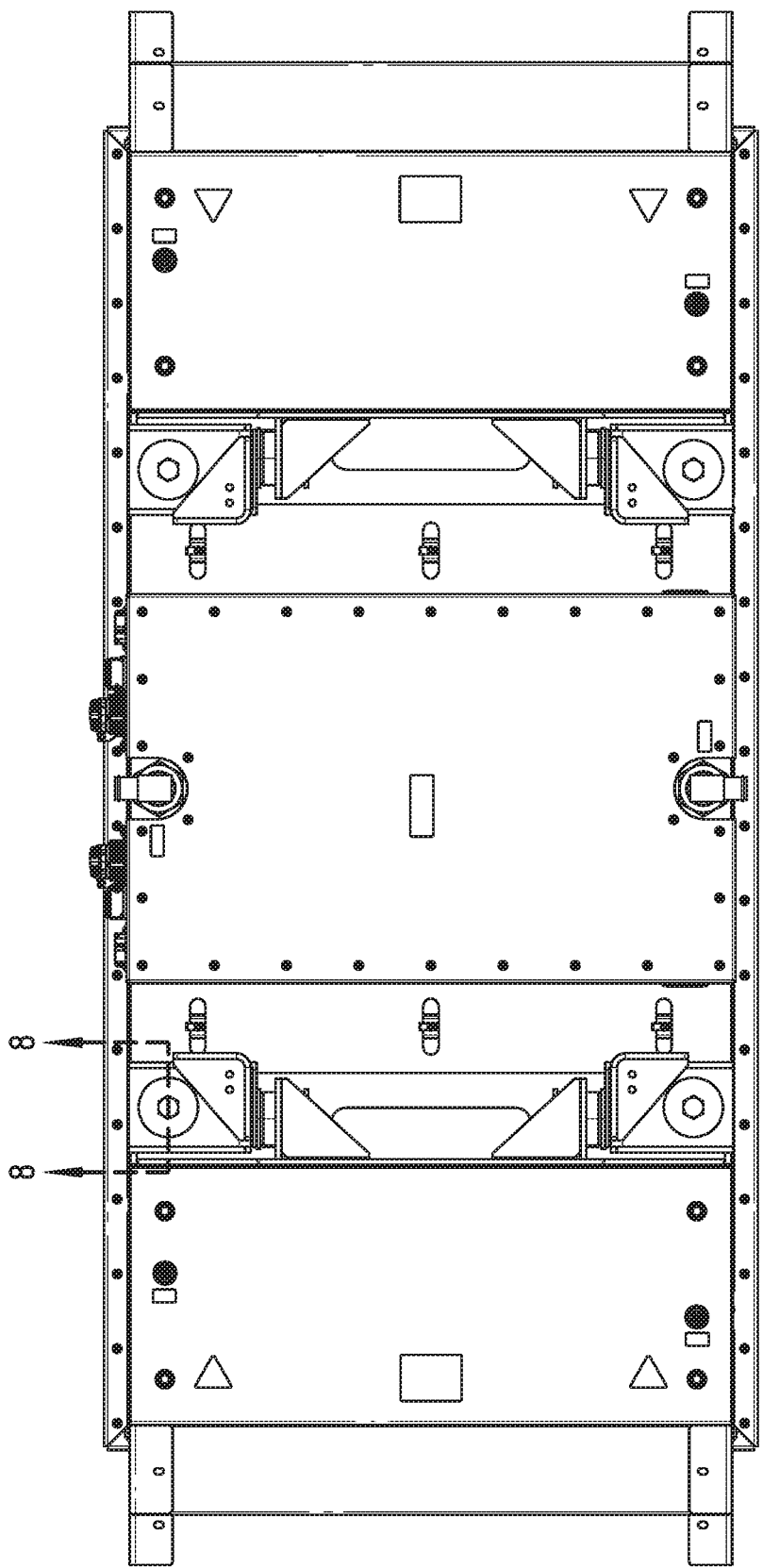
FIG. 5 is a top view similar to that of FIG. 4 with the longitudinal frame rails and frame member bracket removed.

FIGS. 3 and 4D-4E shows details of one embodiment of an electrical conveyance tether system 280. The electrical conveyance tether system 280 can control movement of high voltage cables coupled with the battery assembly 100 such that the service life and safety thereof are enhanced. FIG. 3 shows that the electrical conveyance tether system 280 can include one or a plurality of clips 282 that can be disposed on one of the vertical faces of the battery assembly 100 aligned or parallel with the longitudinal axis A2. The electrical conveyance tether system 280 can include one or a plurality of clips 284 disposed on a top side or surface of the battery assembly 100. The clips 284 can be disposed in the recess 215 of the housing 200.

FIG. 4E shows that a first conductor pair 288A can be coupled with a first contact 286A of the battery assembly 100. A second conductor pair 288B can be coupled with a second contact 286B. The battery assembly 100 can have two operationally separate groups of battery units 220. A first group of the battery units 220 can be configured to provide current to the first contact 286A. A second group of the battery units 220 can be configured to provide current to the second contact 286B. The first conductor pair 288A can be coupled to the first contact 286A to convey the current from the first group of battery units 220 to the front end accessory component assembly 104. The second conductor pair 288B can be coupled to the second contact 286B to convey the current from the second group of battery units 220 to the front end accessory component assembly 104.

The clips 282 can be coupled along the length of the first conductor pair 288A and the second conductor pair 288B to hold a mid-span of the first conductor pair 288A or the second conductor pair 288B against the long side of the housing 200. In one embodiment two clips 282 can be coupled with a vertically slung arc of the first conductor pair 288A to route the first conductor pair 288A to a recess 215 on an opposite side of the longitudinal axis A1 from the first contact 286A. The first conductor pair 288A can transition to a horizontal span that is aligned with a top surface of the housing 200. The horizontal span of the first conductor pair 288A can be received and retained in the recess 215 of the housing 200. The horizontal span of the first conductor pair 288A can be housed between the second lateral portion 208, the central portion 212 and the upper surface 214 of the housing 200 in the vicinity of the recess 215. The first conductor pair 288A can be housed beneath the second longitudinal frame member 54B, as illustrated in FIG. 3. The second conductor pair 288B can be routed in a similar manner from the second contact 286B, across the longitudinal axis A1 in a vertically slung arc to a horizontal span disposed in the recess 215. The horizontal span of the second conductor pair 288B and/or of the first conductor pair 288A can be secured by one or more of the clips 284. FIG. 4E shows that the vertical arc of the first conductor pair 288A is secured by two clips 282. The vertical arc of the first conductor pair 288B is secured by three clips 282. In other examples, the first conductor pair 288A and/or second conductor pair 288B are secured by one, two, three or more clips 282.

The electrical conveyance tether system 280 enables the high voltage conductor pairs 288A, 288B to be routed outside of the frame assembly 54. The second conductor pair 288B can be outboard of at least a portion of the inboard edge of the first longitudinal frame member 54A, e.g., below and in a vertical area bounded by the inboard and outboard edges of the first longitudinal frame member 54A. The first conductor pair 288A can be outboard of at least a portion of the inboard edge of the second longitudinal frame member 54B, below and in a vertical area bounded by the inboard and outboard edges of the second longitudinal frame member 54B. This routing of the first conductor pair 288A and the second conductor pair 288B enables the space between the first longitudinal frame member 54A and second longitudinal frame member 54B to be reserved for conduits of coolant loops and other components.

E. Battery Assembly Housing Including Tolerance Stack-Up Compensation

Figure 11:
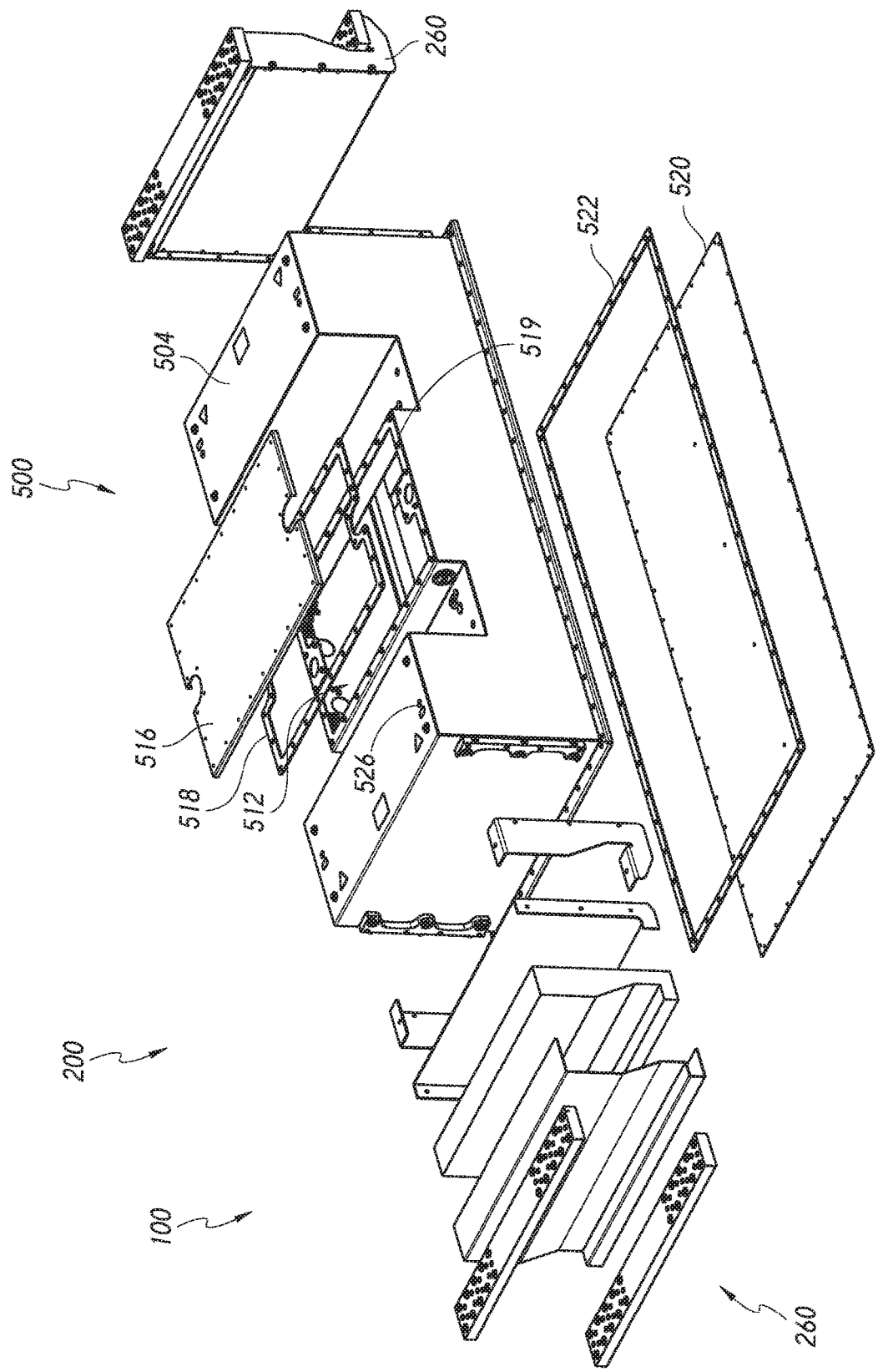
FIG. 11 is an exploded view illustrating components of an housing and of a step assembly of the battery assembly.
Figure 11A:
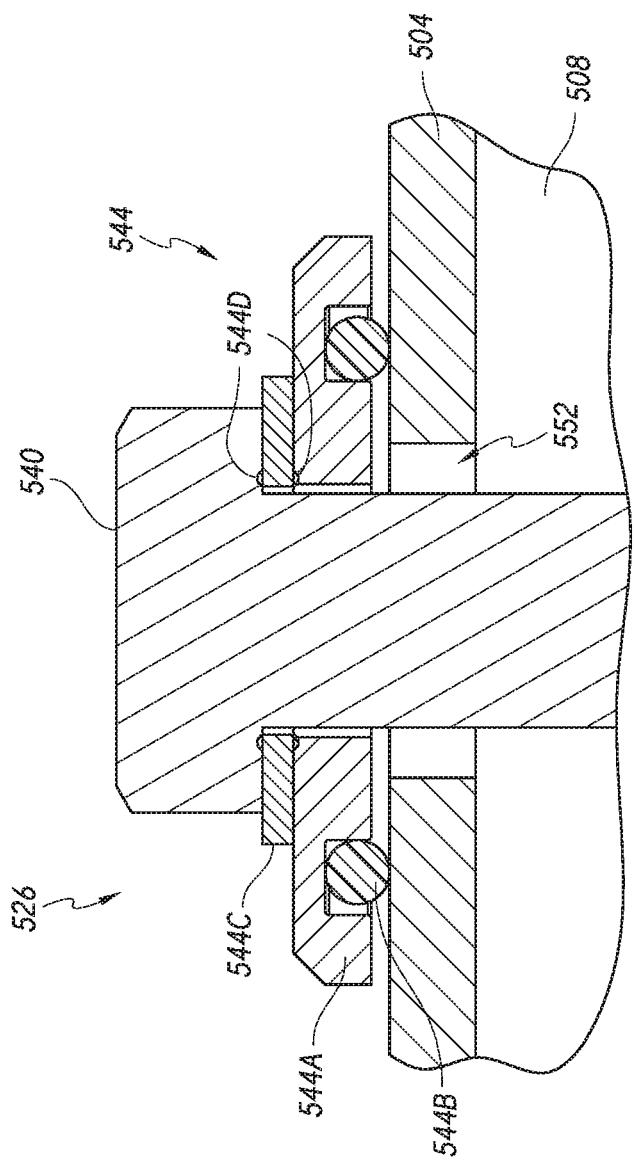
Figure 11B:
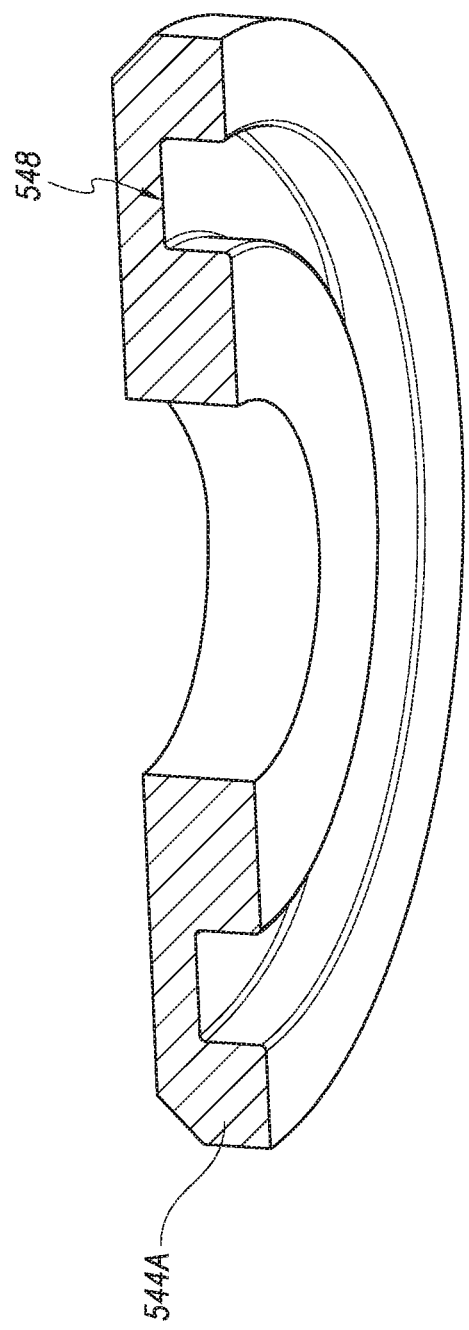
Figure 11D:
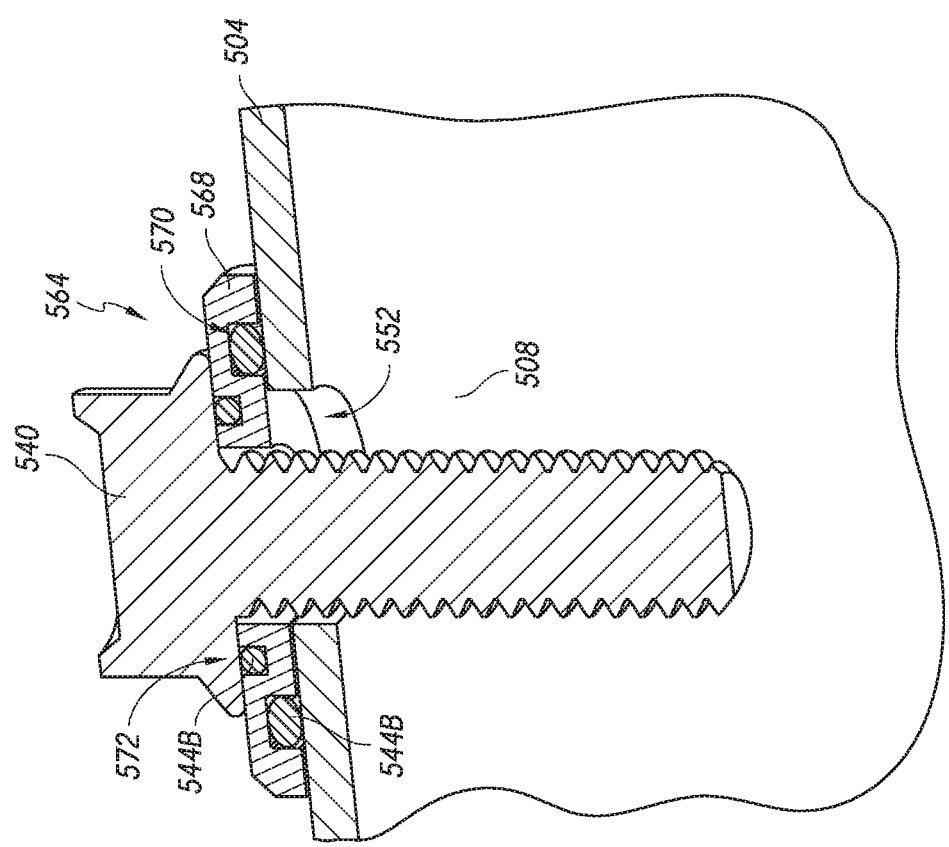

FIGS. 11-11D illustrate examples of the housing 200 in greater detail. The housing 200 includes an enclosure 500 that includes a number of external and internal components. The housing 200 can includes a frame structure 508 that is disposed inside the enclosure 500 that that can support the battery units 220 and other internal components. The frame structure 508 can support and distribute a non-support load, e.g., a load from side impact.

FIG. 11 shows that the enclosure 500 can include a concave shell 504 that at partially surrounds an internal space 512 for housing the battery units 220. The concave shell 504 can include a sheet like external member that is disposed over the frame structure 508 around the internal space 512. The concave shell 504 contributes to providing sufficient ingress protection when assembled with outer components of the housing 200 as discussed further below. The concave shell 504 can include portions around upper segments of each of the first lateral portion 204, the second lateral portion 208, and the central portion 212. The concave shell 504 can have a downward facing opening that can be accessed from below and that provides access to the internal space 512. The concave shell 504 can also have an upper opening that can enable the internal space 512 to be accessed from above. In one example, the downward facing or lower opening is larger than the upper opening. A top cover 516 can be provided to at least partially enclose the upward facing opening of the concave shell 504. The top cover 516 can mate with an upper periphery of the concave shell 504 around the outer edges of the upward facing opening. FIG. 11 shows that the, in one embodiment, the top cover 516 can be disposed in the upwardly oriented recess 216, e.g., between the first lateral portion 204 and the second lateral portion 208. The top cover 516 can be disposed in the central portion 212. A bottom cover 520 can be provided to enclose the downward facing opening of the concave shell 504. The bottom cover 520 can extend over any portion of the outer periphery of the lower face of the enclosure 500. The bottom cover 520 can be configured to mate with an outer periphery of the concave shell 504 on the bottom edge thereof.

One or both of the top cover 516 and the bottom cover 520 can be configured to contribute to maintaining sufficient ingress protection together with the concave shell 504. For example, a gasket 518 can be provided between the top cover 516 and the concave shell 504. The gasket 518 can be compressed upon application of the top cover 516 to the concave shell 504 such that moisture flow into the internal space 512 between the concave shell 504 is limited or prevented under normal conditions of use of the battery assembly 100. A gasket 522 can be disposed between the bottom cover 520 and the concave shell 504. The gasket 522 can be compressed such that under normal conditions of use of the battery assembly 100 the gasket 522 limits or prevents moisture from entering the internal space 512 between the bottom cover 520 and the concave shell 504. The gasket 518 and the gasket 522 thus help to maintain a sufficient level of moisture ingress protection. A fastener 519 can be used to secure the top cover 516 and/or the bottom cover 520 to the concave shell 504. The fastener 519 can include one of a plurality of bolts disposed around the periphery of the top cover 516 or the bottom cover 520, e.g., through the gasket 518 and/or through the gasket 522.

In addition a fastener 540 can be provided to further connect the concave shell 504 to the frame structure 508 and/or another load bearing member to the enclosure 500 in a way preserving the level of ingress protection to the internal space 512 despite a stack up of tolerances. A stack-up of tolerances can result from the assembly of a number of components, each of which has a tolerance level. The combination of the tolerances can result in a gaps that can make managing ingress protection for moisture more difficult. The fastener 540 includes a load spreading component 544 that includes a first load spreading member 544A and a seal member 544B. The load spreading component 544 can also include a second load spreading member 544C and a seal member 544D. FIG. 11A shows that where the second load spreading member 544C is separate from the first load spreading member 544A and from the fastener 540, there may be two seal member 544D. One of the two seal member 544D may be positioned between the fastener 540 and the second load spreading member 544C. One of the two seal member 544D may be positioned between the second load spreading member 544C and the first load spreading member 544A. One, both or all of the seal member 544B and the seal members 544D can be configured as an O-ring.

FIG. 11B shows that a seal member channel 548 can be provided in the first load spreading member 544A. The seal member channel 548 can receive the seal member 544B to be provided and compressed between the seal member channel 548 and the outside surface of the concave shell 504. The seal member 544B can be provided to prevent moisture to move through the interface between the first load spreading member 544A and the concave shell 504 and into the internal space 512. The seal member 544D prevents moisture from flowing between the second load spreading member 544C and the head of the fastener 540 and/or between the second load spreading member 544C and the first load spreading member 544A. In some embodiments, the seal member 544B is larger than the seal member 544D. The seal member 544B can be about 1.5 inches in diameter in one embodiment. The seal member 544B can be about two times larger than the seal member 544D in diameter. The seal member 544B can be about three times thicker than the seal member 544D. Preferably the seal member 544B is deformation resistant, e.g., stiff, to resist deformation upon torquing the fastener 440. The seal member 544B preferably is configured to achieve a clamp load by virtue of the stiffness thereof.

FIGS. 11C-11D show another embodiment of a load spreading component 564. The load spreading component 564 includes a load spreading member 568 that can be disposed between an outside surface of the concave shell 504 and a head portion of a fastener 540A. The load spreading member 568 can have two channels disposed therein in the load spreading. The load spreading component 564 can include a first seal member channel 570 disposed on a side of the load spreading member 568 facing the concave shell 504 and the concave shell 504. The seal member 544B can be disposed in the first seal member channel 570. The load spreading member 568 can include a second seal member channel 572 disposed on a side of the load spreading member 568 opposite the first seal member channel 570. The second seal member channel 572 can face a head of the fastener 540. A seal member 544B can be placed in the second seal member channel 572. The fastener 540 can be coupled with another fastener components, e.g., a nut in the plate member 462 or a similar structure. Advancing the fastener 540 into the nut causes compression of the seal member 544B between the load spreading member 568 and the concave shell 504. Advancing the fastener 540 into the nut causes compression of the seal member 544B between the load spreading member 568 and the concave shell head of the fastener 540.

Advancing the fastener 540 provides ingress protection for moisture between two discrete possible moisture paths. The load spreading component 564 prevents ingress of moisture through multiple paths with a single monolithic member. Specifically, the seal member 544B disposed in the first seal member channel 570 between the prevents moisture from entering the internal space 512 of the enclosure 500 through an interface between the load spreading component 564 and the outer surface of the concave shell 504. The seal member 544B in the second seal member channel 572 prevents moisture from entering the internal space 512 of the enclosure 500 through an interface between the load spreading component 564 and the head of the fastener 540. Also, the load spreading component 564 enables a large tolerance gap 552 to be accommodated without impacting the ability of the battery assembly 100 to remain appropriately free of moisture or to maintain moisture levels below acceptable limits. The tolerance gap 552 can be a gap that is an accumulation of tolerances from several parts. The tolerance gap 552 can be up to 10 percent of the diameter of the shaft of the fastener 540. The tolerance gap 552 can be up to 20 percent of the diameter of the shaft of the fastener 540. The tolerance gap 552 can be up to 30 percent of the diameter of the shaft of the fastener 540. The tolerance gap 552 can be up to 40 percent of the diameter of the shaft of the fastener 540.

The lower surface of the load spreading member 568 can have an inner area between the first seal member channel 570 that has a radial width, e.g., between the periphery of a central opening thereof and an inner edge of the first seal member channel 570, that is at least 10 percent of the diameter of the shaft of the fastener 540. The lower surface of the load spreading member 568 can have an inner area with a radial width that is at least 20 percent, at least 30 percent, at least 40 percent, or at least vehicle assembly 50 percent of the diameter of the shaft of the fastener 540. Similarly, the lower surface of the first load spreading member 544A can have an inner area between the seal member channel 548 that has a radial width, e.g., between the periphery of a central opening thereof and an inner edge of the seal member channel 548, that is at least 10 percent of the diameter of the shaft of the fastener 540. The lower surface of the first load spreading member 544A can have an inner area with a radial width that is at least 20 percent, at least 30 percent, at least 40 percent, or at least vehicle assembly 50 percent of the diameter of the shaft of the fastener 540. The inner area of the first load spreading member 544A and the load spreading member 568 enable the seal member 544B to be outward of a hole such that a tolerance gap 552 can be accommodated while maintaining the seal member 544B outside of the hole in the concave shell 504 such that the seal member 544B continues to maintain the seal as described above.

The first load spreading member 544A and the load spreading component 564 as well as the assemblies into which they are incorporated enable somewhat looser tolerances for these many components such that the battery assembly 100 can be more economically produced.

F. Step Assembly

Figure 12:
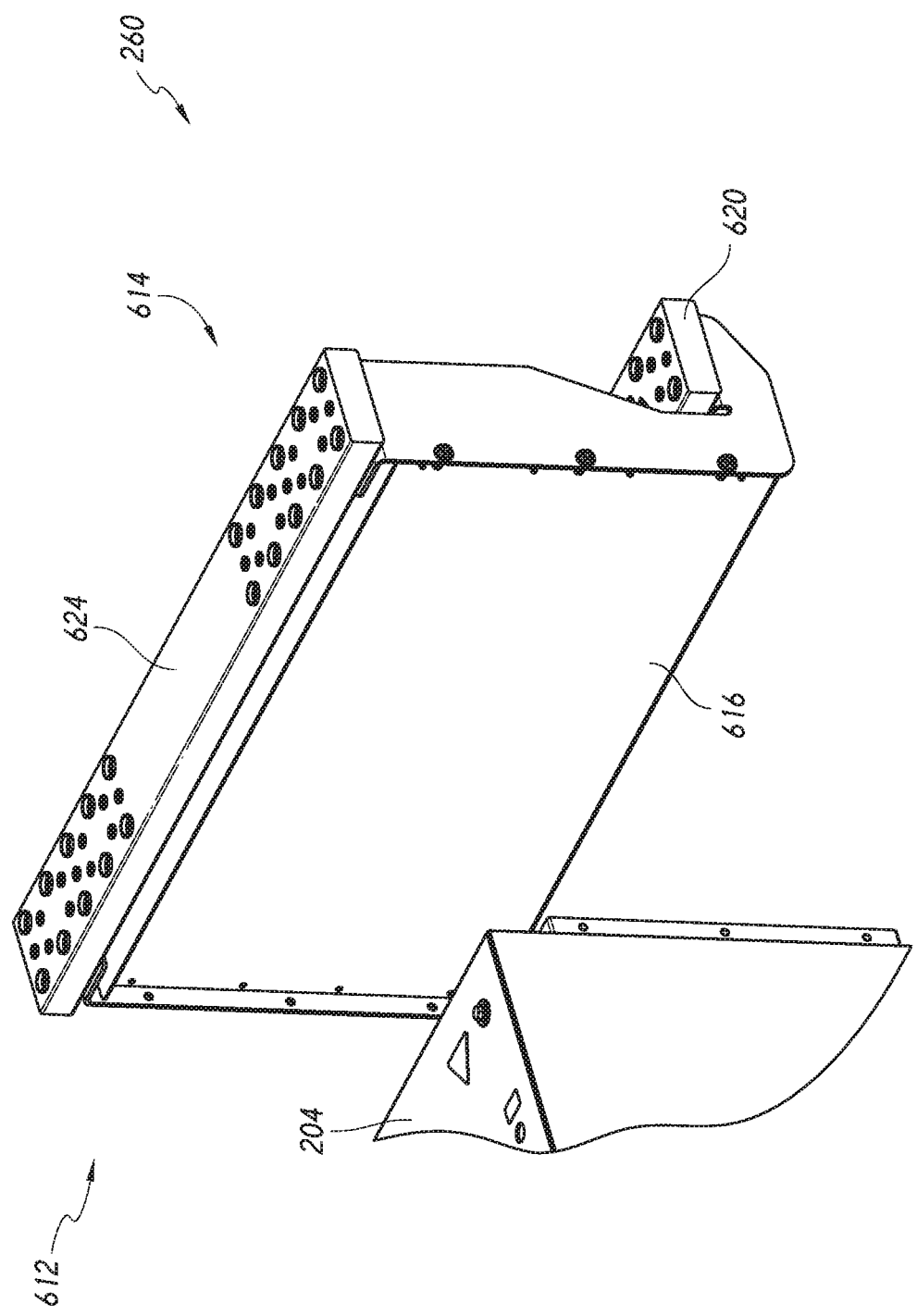
FIG. 12 shows a step assembly separated from a lateral portion of a battery assembly.
Figure 12A:
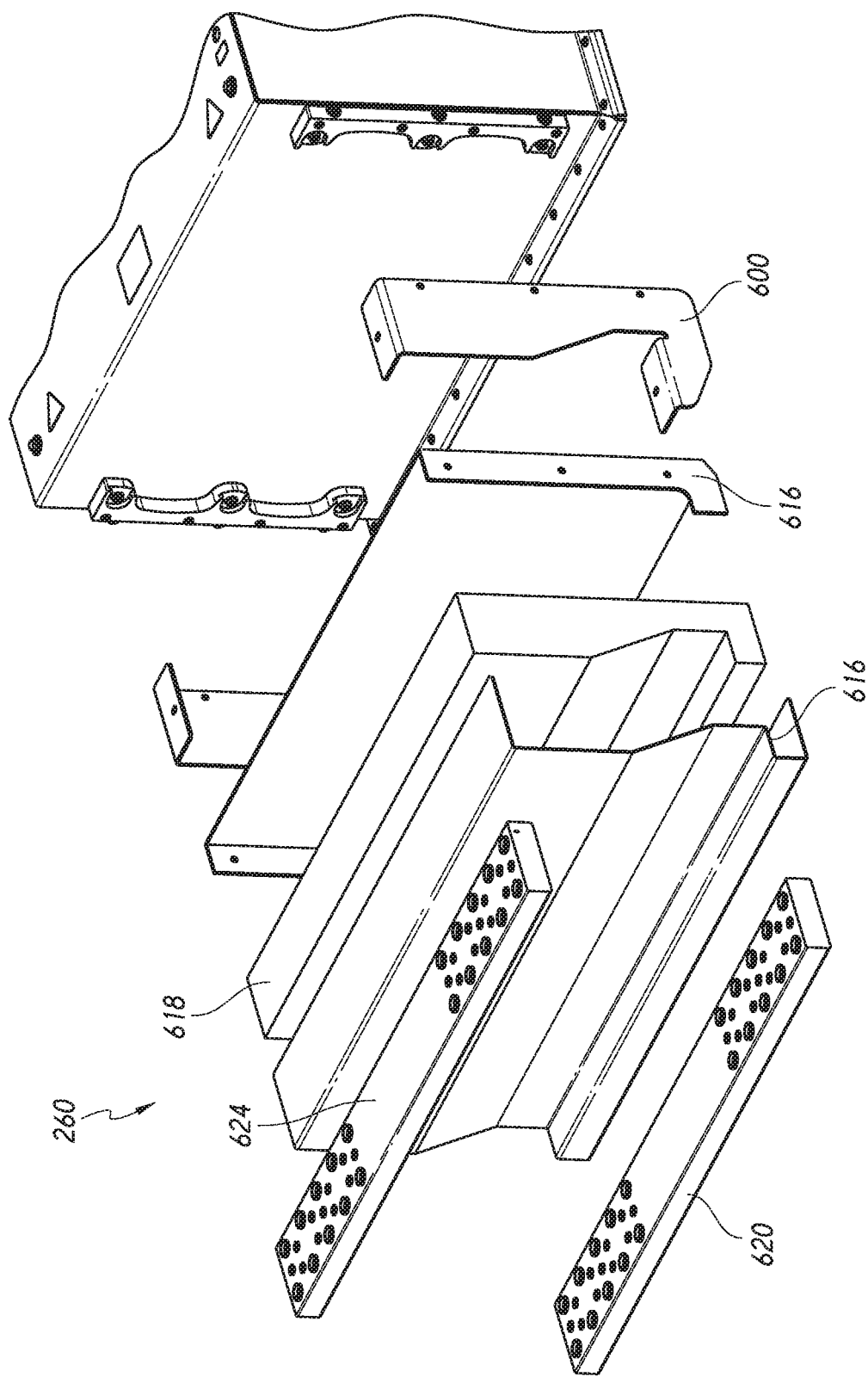
FIG. 12A is an exploded views of one example of a step assembly.

FIGS. 12 and 12A illustrate the step assembly 260 both separated from the enclosure 500 and in an exploded view format, respectively. The step assembly 260 can include a step mounting bracket assembly 600 on an outboard side of the housing 200. For example the step assembly 260 can be mounted to a lateral side of the first lateral portion 204 of the housing 200. The step assembly 260 can be mounted on the opposite lateral side, e.g., on the second lateral portion 208. The step assembly 260 can be mounted on both sides of the housing 200, e.g., on the first lateral portion 204 and on the second lateral portion 208.

The step assembly 260 can be an assembly including a vehicle side 612 that is configured to be coupled with the housing 200. The vehicle side 612 can also be an inboard side. The step assembly 260 can include a lateral side 614 located on the opposite side from the vehicle side 612. The lateral side 614 can be an outboard side of the step assembly 260. The vehicle side 612 of the step assembly 260 can be configured to mate to the step mounting bracket assembly 600 as discussed further below. The step assembly 260 can include a lower step 620 and an upper step 624. The lower step 620 can be disposed on the lateral side 614 of the step assembly 260. The upper step 624 can be disposed on the lateral or a top side of the step assembly 260. The upper step 624 can be disposed at an elevation above an elevation of the lower step 620. The position of the upper step 624 along the direction of the longitudinal axis A2 can be inboard compared to the position of the lower step 620 such that a natural or comfortable step distance can be provided therebetween. One or both of the lower step 620 and the upper step 624 can include roughened areas that have enhanced traction, as shown.

The step assembly 260 can include an enclosure 616 enclosing a space therein, the enclosure 616 configured to be coupled with the mounting bracket step mounting bracket assembly 600. The enclosure 616 can enclose a crumple member 618 disposed therein. The crumple member 618 can be configured to collapse upon application of a load of a certain type. For example, a side impact can cause the crumple member 618 to absorb at least some of the energy of the impact by being crushed or collapsing upon itself. In one embodiment, the crumple member 618 includes a honeycomb structure that has high strength in some directions, e.g., in a vertical direction. The crumple member 618 can be creased, pre-crumped, or non-uniformly weakened to some extent such that the collapse of the structure is predictable or planned or is in a manner that is preferred. The honeycomb structure can be aligned in a vertical direction. For example, the longitudinal axes of the honeycomb structures can be aligned with the vertical direction. The honeycomb structures will collapse inwardly or transverse to the longitudinal axes thereof upon a side load above a threshold consistent with a side impact.

Figure 12B:
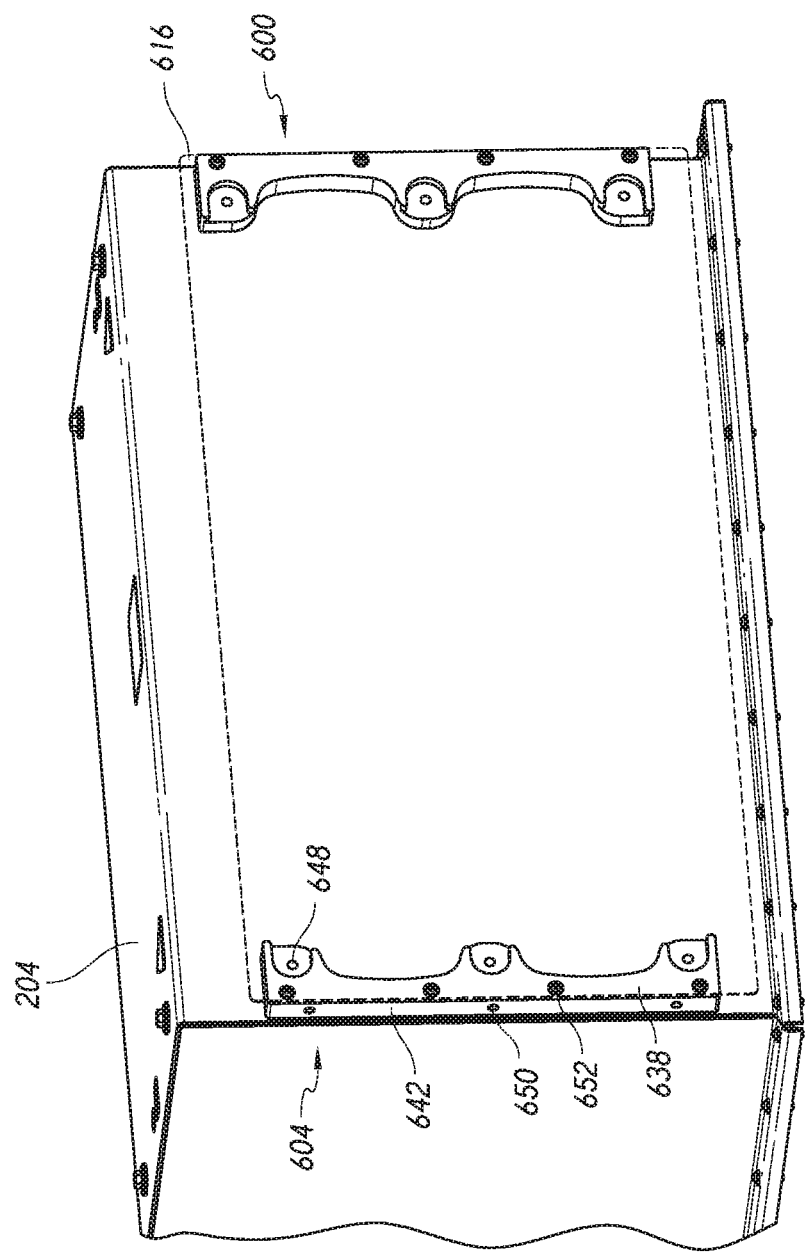
FIG. 12B is a perspective view illustrating a multi-point load spreading member for supporting a step assembly to a housing of a battery assembly.

FIG. 12B shows more detail of how the step assembly 260 is mounted to the first lateral portion 204 of the battery assembly 100. The step mounting bracket assembly 600 can have a multi-point load spreading member 604 that is configured to receive and transfer a standard step loading and a side impact loading to the housing 200 in a planned manner. As with the fastener 540 and the load spreading component 564, the multi-point load spreading member 604 is configured to provide significant load support on the housing 200 while at the same time preserving or maintaining ingress protection. The multi-point load spreading member 604 can include a first side 636 for mating with the enclosure 500 of the housing 200. The multi-point load spreading member 604 can include a second side 638 opposite to the first side 636. The second side 638 can be configured to mate the multi-point load spreading member 604 to the enclosure 500 of the housing 200. The second side 638 can be configured to receive a first step support fastener aperture 650 to support a load of the step assembly 260. The multi-point load spreading member 604 can include a third side 642 between the first side 636 and the second side 638. The third side 642 can be configured to receive a second step support fastener aperture 652. The second step support fastener aperture 652 can transfer a portion of the load of the step assembly 260 to the multi-point load spreading member 604 and thereby to a frame member of the battery assembly 100.

FIG. 12C shows the multi-point load spreading member 604 in further detail. The multi-point load spreading member 604 includes a plurality of, e.g., three seal member channels 646. Each seal member channel 646 can be configured to receive a seal member which can be similar to the seal member 544B. The seal members in the seal member channel 646 provides ingress protection between the first side 636 of the multi-point load spreading member 604 and the side surface of the enclosure 500 of the housing 200.

The multi-point load spreading member 604 provides a feature that is attached to but is not otherwise fluidly connected to the interior of the enclosure 500. As a result, providing many apertures, such as the first step support fastener aperture 650 and the second step support fastener aperture 652 in the multi-point load spreading member 604 does not increase the risk of ingress of moisture into the interior of the enclosure 500 of the housing 200.

FIG. 12B shows that the step assembly 260 can be mounted to the multi-point load spreading member 604 seven points. The illustrated embodiment provides two multi-point load spreading member 604, one for a front and one for a rear part of the step assembly 260. Each of the multi-point load spreading member 604 can be coupled to the step assembly 260 at a plurality of points on the second side 638 (e.g., four points on the second side 638) and another plurality of points on the third side 642 (e.g., three points). The step assembly 260 can be coupled with the step mounting bracket assembly 600 at seven points. In an assembly with a step mounting bracket assembly 600 at opposite ends of the step assembly 260, there can be fourteen points of connection compared to six structural mounts to the housing 200. This arrangement is one example of how the load can be spread to more than twice as many spots on the housing 200 as the number of locations that the two multi-point load spreading members 604 are mounted to the housing 200.

The step assembly 260 thus provides for extensive load support in a stepping application. A honeycomb or similar configuration of the crumple member 618 helps support the vertical load typical of stepping. The step assembly 260 also is pre-configured to absorb a side impact load and thereby to dissipate some of the energy of the side impact. A portion of the load of a side impact is transferred through the battery assembly 100 to the frame assembly 54 of the vehicle assembly 50.

II. Further Battery & Modular Assemblies

Figure 3A:
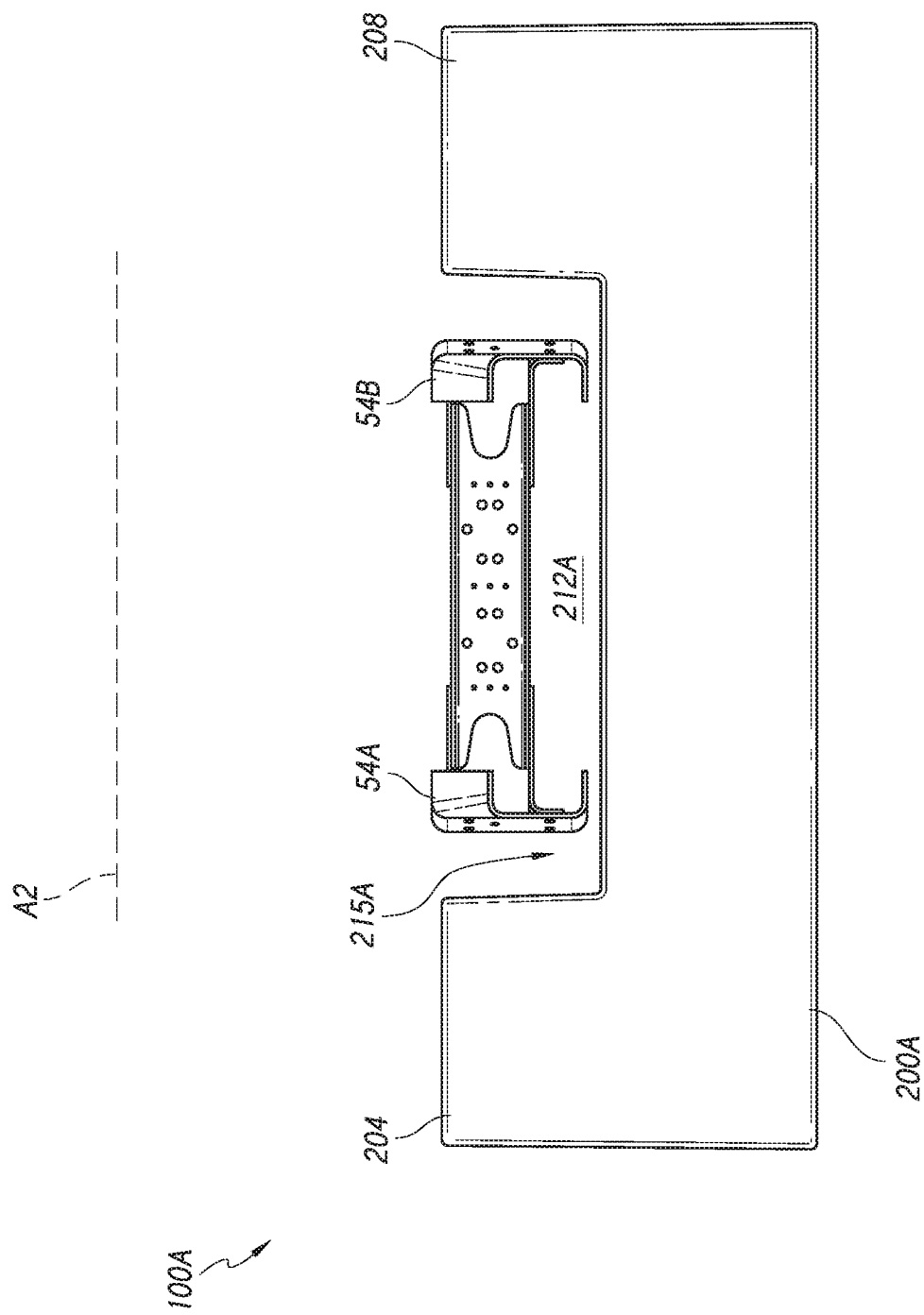
FIG. 3A is a schematic front or rear view of another example of a battery assembly with a U-shaped housing configuration, configured to be mounted to longitudinal frame members of a frame assembly of a vehicle assembly.
Figure 3B:
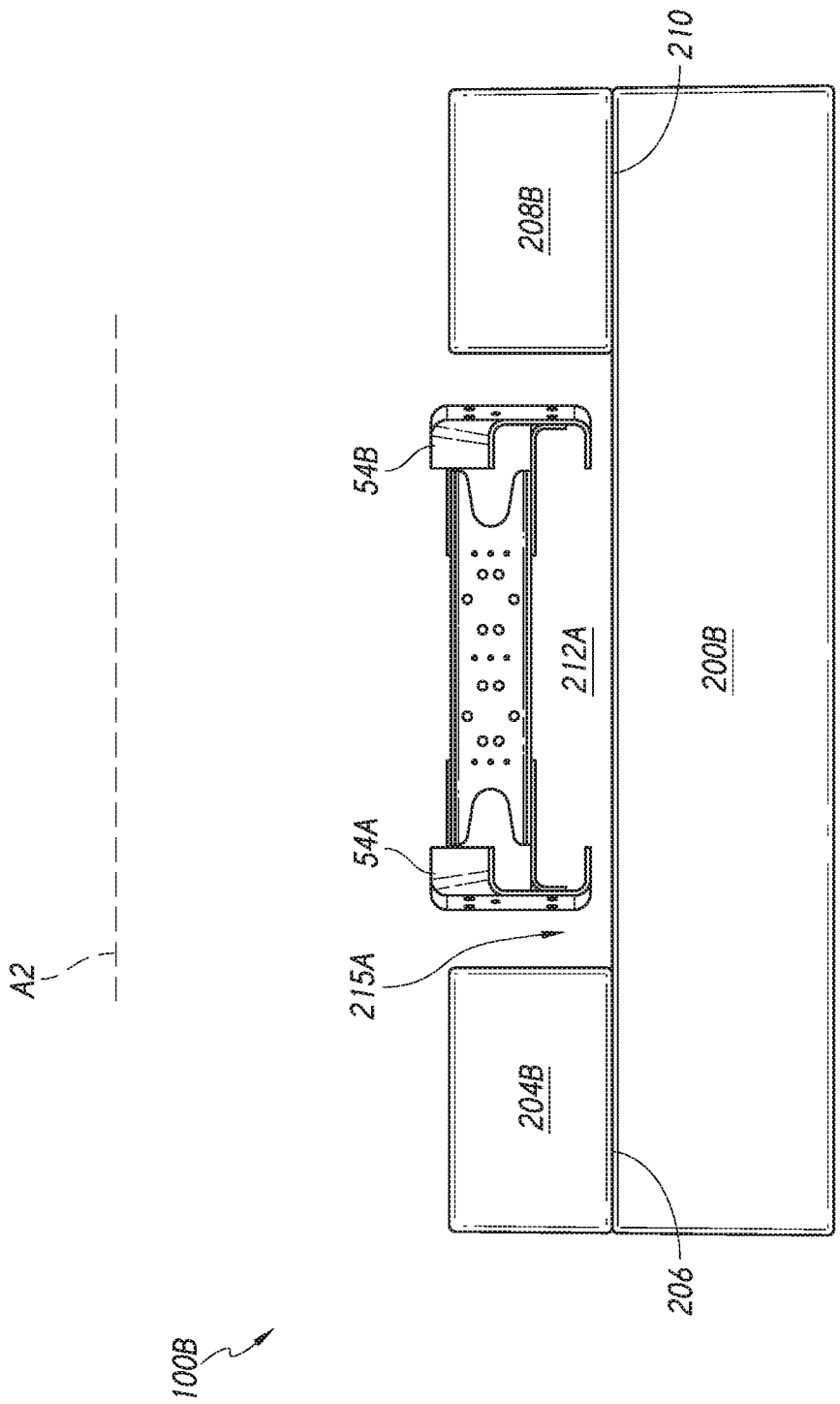
FIG. 3B is a schematic front or rear view of a modular battery assembly having multiple components that can be assembled into a U-shaped housing configuration and that can be mounted to longitudinal frame members of a frame assembly of a vehicle assembly.

FIGS. 3A-3C show additional battery assemblies that can be provided and that can include any of the components or features of the battery assembly 100 described above. In addition, any of the battery assemblies of FIGS. 3A-3C can be combined into any of the systems described above such as including the front end accessory component assembly 104, the rear end electric component assembly 108, and/or the axle drive assembly 112. Any of the features of the battery assemblies of FIGS. 3A-3C can be combined into the battery assembly 100 as such features are consistent with the description of the battery assembly 100.

FIG. 3A shows a battery assembly 100A that can have a housing 200A is elongate along a longitudinal axis A2. The battery assembly 100A can be oriented such that the longitudinal axis A2 thereof is transverse to the longitudinal axis A1 of a vehicle assembly to which the battery assembly 100A is to be mounted. The housing 200A can include a first lateral portion 204 and a second lateral portion 208. The first lateral portion 204 and the second lateral portion 208 can define a recess 215A disposed therebetween. The recess 215A can be configured to receive first longitudinal frame member 54A and second longitudinal frame member 54B of a frame assembly 54. A mounting system similar to the mounting system 240 can be coupled to the housing 200A within the recess 215A. The mounting system could be disposed between a surface of the first lateral portion 204 facing the recess 215A and an outer surface of the first longitudinal frame member 54A. The mounting system could be disposed between a surface of the second lateral portion 208 facing the recess 215A and an outer surface of the second longitudinal frame member 54B.

The housing 200A can include a central portion 212A disposed between the first lateral portion 204 and the second lateral portion 208. The central portion 212A can have a flat configuration from the first lateral portion 204 to the second lateral portion 208. Unlike the battery assembly 100, the battery assembly 100A excludes a projection into the recess 215A. FIG. 3A shows a U-shaped profile from the end view. The battery assembly 100A provides more clearance for the frame assembly of a vehicle assembly with which the battery assembly 100A is to be coupled. This arrangement allows the space between the first longitudinal frame member 54A and the second longitudinal frame member 54B to be occupied by other components and not to be occupied by portions of the housing 200A. In the illustrated embodiment the first longitudinal frame member 54A and the second longitudinal frame member 54B can be partially or almost entirely received within the recess 215A. This can enhance or volume of the first lateral portion 204 and the second lateral portion 208 to contain battery units similar to the battery units 220.

FIG. 3B shows another embodiment of a battery assembly 100B that can be modular. The battery assembly 100B can include a housing 200B that can be flat on a top side thereof. The housing 200B can be rectangular in outer profile. The housing 200B can enclose battery units 220. The housing 200B can be provided with a mounting system that can be similar to the mounting system 240 discussed above such that the rectangular housing 200B can be mounted beneath the first longitudinal frame member 54A and the second longitudinal frame member 54B. The battery assembly 100B can optionally have one or more components that can be coupled thereto. For example, a first lateral component 204B can be provided that can be secured to the housing 200B. In another embodiment a second lateral component 208B is provided that can be secured to the housing 200B. In one assembly the first lateral component 204B and the second lateral component 208B are connected to the housing 200B.

The first lateral component 204B and the second lateral component 208B can be assemblies enclosing more battery units similar to the battery units 220 to optionally increase the energy storage capacity. One or more of the first lateral component 204B and the second lateral component 208B can include power distribution components (e.g., some or all of the electronics housed in the rear end electric component assembly 108) to enable these components to be located with the housing 200B in the battery assembly 100B. In some applications the lateral aspects of the housing 200B can be used to couple other components to a vehicle assembly, such other components including any one or more of an accessory battery (e.g., 12V battery), air tanks, traction batteries, power electronics, air compressor, radiators, fuel cells, hydrogen tanks, or any other application specific items. Because space along the frame rails of a vehicle is limited and highly sought after there can be an advantage to combining the housing 200B with other electric vehicle components or even with components of other vehicle systems.

The connection between the housing 200B and the first lateral component 204B and/or the second lateral component 208B can vary depending on the nature of the first lateral component 204B and the second lateral component 208B. These components can be mechanically secured to the housing 200B by mechanical fasteners such as pins, bolts, clamps and other components. Depending on the application, the mechanical fastener connection can be secured to provide and/or maintain ingress protection, as described above. If the first lateral component 204B and the second lateral component 208B are electrically integrated with the housing 200B an electrical connection can be provided therebetween. An electrical connector between the first lateral component 204B and the housing 200B can be provided, similar to a plug and socket. A conductive projection on the first lateral component 204B or the housing 200B can be received in a conductive recess on the first lateral component 204B or housing 200B across an interface 206. The interface 206 can be the location where the outer surface of the lower side of the first lateral component 204B rests on a top surface of the housing 200B. An electrical connector between the second lateral component 208B and the housing 200B can be provided, similar to a plug and socket. A conductive projection on the second lateral component 208B or the housing 200B can be received in a conductive recess on the second lateral component 208B or housing 200B across an interface 210. The interface 210 can be the location where the outer surface of the lower side of second lateral component 208B rests on a top surface of the housing 200B. The interface 206 and the interface 210 can be disposed along a same plane, e.g., a plane that also extends along the top surface of the recess 215A. One or more of the first lateral component 204B and the second lateral component 208B can be connected to the housing 200B by conductors or cables.

FIG. 3C shows a further embodiment of a battery assembly 100C that is similar to the battery assembly 100B. The battery assembly 100C includes the housing 200B, which can be a rectangular assembly as discussed above. The first lateral component 204B and the second lateral component 208B can optionally be provided as discussed above. In one variation, a central component 212C can be provided and can be mounted to the housing 200B along an interface 213. The central component 212C can be connected in any of the ways described above in connection with the first lateral component 204B. The central component 212C can include electrical components configured to couple with battery units disposed in the second lateral component 208B. The central component 212C can include housing similar to the battery units 220 and similar to the battery units housed in the housing 200B. If electrical components are provided in the central component 212C one or more projections can be provided on a lower side of the central component 212C. Such projections can be configured to extend into one or more recesses of the housing 200B across an interface 213 between the housing 200B and the central component 212C. The interface 213 can be disposed between a lower surface of the housing of the central component 212C and an upper surface of the housing 200B. One or more projections can be provided on an upper side of the housing 200B and can extend into one or more recesses on a lower side of the central component 212C across the interface 213. The central component 212C can include power distribution components (e.g., some or all of the electronics housed in the rear end electric component assembly 108) to enable these components to be located with the housing 200B in the battery assembly 100C.

The battery assembly 100C provides for a rectangular housing 200B enclosing battery units that can be used by itself on a vehicle in a first configuration. A second assembly can include the central component 212C coupled with the housing 200B to provide more battery units, power distribution components or other components directly connected to the housing 200B. A third assembly can include one of the first lateral component 204B and second lateral component 208B. A fourth assembly can include both of the first lateral component 204B and second lateral component 208B. A fifth assembly can include both of the first lateral component 204B and second lateral component 208B and the central component 212C. Any other combination of the housing 200B, first lateral component 204B, second lateral component 208B, and central component 212C can be provided. Any of these components can be connected by projection and recess arrangement, as described above, or with cables and cable junctions that can be disposed outside of the interfaces 206, 208, and 213.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A battery assembly for an electric vehicle, comprising:
    a housing having a lateral portion and a central portion, the housing including an upwardly oriented concavity between the lateral portion and the central portion;
    one or more battery units disposed within the housing at least in the central portion; and
    a mounting system disposed adjacent to or within the concavity, the mounting system further comprising:
        a frame member bracket configured to connect to a frame member of a vehicle; and
        a housing bracket system comprising:
            a housing bracket configured to be coupled to the frame member bracket;
            a load member having a first portion disposed adjacent to an upper surface of the housing and a second portion disposed along the lateral portion;
            a vibration isolator disposed between the load member and the housing bracket to reduce load transmission from the frame member of the vehicle to the housing.

2. The battery assembly of claim 1, further comprising an ingress preventing anchor member disposed in the housing, the vibration isolator being secured to the ingress preventing anchor member.

3. The battery assembly of claim 2, wherein the ingress preventing anchor member comprises a plate member having a blind recess formed therein, the blind recess configured to receive a fastener disposed through the vibration isolator.

4. The battery assembly of claim 3, wherein the blind recess comprises at least one flat surface configured to restrict rotation of an internally threaded member therein.

5. The battery assembly of claim 1, wherein the mounting system comprises a forward frame member bracket and a forward housing bracket system and a rearward frame member bracket and a rearward housing bracket system.

6. The battery assembly of claim 5, wherein the mounting system further comprises:
    a second forward frame member bracket and a second forward housing bracket system; and
    a second rearward frame member bracket and a second rearward housing bracket system.

7. The battery assembly of claim 1, wherein the frame member bracket is configured to be coupled to an outboard side of a frame member of a vehicle and the load member is configured to be disposed outboard of the frame member bracket, the load member being disposed between the frame member and the lateral portion of the housing.

8. The battery assembly of claim 1, wherein the vibration isolator is a first vibration isolator and further comprising a second vibration isolator disposed between the load member and the housing bracket to reduce load transmission from the frame member of the vehicle to the housing.

9. The battery assembly of claim 8, wherein the first vibration isolator is configured to reduce vertical load transmission and the second vibration isolator is configured to reduce horizontal load transmission.

10. A battery assembly for an electric vehicle, comprising:
    a housing comprising a concave shell with an internal space and an opening for providing access to the internal space;
    one or more battery units disposed within the internal space of the housing; and
    a fastener assembly configured to secure another component of the battery assembly to the concave shell while maintaining ingress protection, the fastener assembly including a bolt, a load spreading member and at least one seal member disposed in a recess of the load spreading member on a side of the load spreading member facing or contacting the housing.

11. The battery assembly of claim 10, wherein the other component comprises a mounting system for connecting the battery assembly to a vehicle frame.

12. The battery assembly of claim 11, wherein the bolt secures a vibration isolator against the housing.

13. The battery assembly of claim 10, wherein the other component comprises a step mounting bracket, ingress protection being provided between a multi-point loading spreading member and an outboard side of the housing.

14. The battery assembly of claim 10, wherein the load spreading member comprises an elongate bracket.

15. The battery assembly of claim 14, wherein the elongate bracket comprises a multi-point load spreading member comprising a plurality of anchor apertures, the recess surrounding one of the anchor apertures.

16. The battery assembly of claim 14, wherein the elongate bracket comprises apertures for supporting a vertical load of a step assembly on at least two sides thereof.

17. The battery assembly of claim 10, wherein the load spreading member comprises an aperture sized to receive the bolt and an inner area disposed between the aperture and the recess, the inner area configured to space a tolerance gap of the battery assembly.

18. The battery assembly of claim 17, wherein the inner area comprises a radial width of at least 10 percent of the diameter of the bolt.

19. A battery assembly for an electric vehicle, comprising:
   a housing having a first lateral portion, a second lateral portion, and a central portion;
   one or more battery units disposed within the housing;
   a step assembly comprising:
      a vehicle side comprising a mounting bracket, and
      at least one step disposed on an outboard side of the step assembly;
   a mounting system for connecting the battery assembly to a vehicle chassis; and
   a load structure disposed within the housing and around the one or more battery units, the load structure configured to convey therethrough and to the mounting system a load applied at the step assembly that is directed toward the battery assembly.

20. The battery assembly of claim 19, wherein the at least one step comprises a lower step and further comprising an upper step disposed on the outboard side or a top side of the step assembly at an elevation above an elevation of the lower step.

21. The battery assembly of claim 19, wherein the mounting bracket comprises a first side configured to be placed on or to face an outboard side of the housing and another side comprising an aperture configured to secure an enclosure having a crumple member disposed therein to the mounting bracket to support a vertical load.

22. The battery assembly of claim 21, wherein the other side comprises a side transverse to the first side.

23. A battery assembly for an electric vehicle, comprising:
   a housing having a first lateral portion, a second lateral portion, and a central portion;
   one or more battery units disposed within the housing; and
   a step assembly comprising:
      a vehicle side comprising a mount, and
      at least one step disposed on an outboard side of the step assembly;
   wherein the mount comprises a first side configured to be placed on or to face an outboard side of the housing and a second side disposed opposite the first side, the second side comprising a plurality of points for coupling the at least one step to the housing to support a vertical load.

24. The battery assembly of claim 23, wherein the mount is a mounting bracket.

25. The battery assembly of claim 24, the mount further comprising a side transverse to the second side, the transverse side comprising an aperture configured to secure an enclosure having a crumple member disposed therein to the mount to support a vertical load.

26. A battery assembly for an electric vehicle, comprising:
   a housing having a first lateral portion, a second lateral portion, and a central portion;
   one or more battery units disposed within the housing; and
   a step assembly comprising:
      a vehicle side comprising a mounting bracket,
      an enclosure coupled with the mounting bracket;
      a crumple member disposed in the enclosure; and
      at least one step disposed on an outboard side of the step assembly.

27. The battery assembly of claim 26, wherein the crumple member is configured to provide higher load support in a vertical direction than in a horizontal direction.

28. The battery assembly of claim 26, wherein the crumple member comprises a honeycomb structure.

29. The battery assembly of claim 28, wherein the honeycomb structure is oriented perpendicular to a direction aligned with a thickness of the step assembly.

30. The battery assembly of claim 29, wherein the honeycomb structure is oriented such that cells thereof are vertically oriented.

* * * * *